US011962910B2

(12) United States Patent
Fukui

(10) Patent No.: US 11,962,910 B2
(45) Date of Patent: Apr. 16, 2024

(54) IMAGING APPARATUS, IMAGE PROCESSING SYSTEM, AND CONTROL METHOD FOR IMAGING APPARATUS

(71) Applicant: CANON KABUSHIKI KAISHA, Tokyo (JP)

(72) Inventor: Toshiyuki Fukui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 17/843,776

(22) Filed: Jun. 17, 2022

(65) Prior Publication Data

US 2022/0408004 A1 Dec. 22, 2022

(30) Foreign Application Priority Data

Jun. 22, 2021 (JP) ................................. 2021-103045

(51) Int. Cl.
*H04N 23/71* (2023.01)
*H04N 1/32* (2006.01)
*H04N 23/73* (2023.01)
*H04N 101/00* (2006.01)

(52) U.S. Cl.
CPC ......... *H04N 23/71* (2023.01); *H04N 1/32128* (2013.01); *H04N 23/73* (2023.01); *H04N 2101/00* (2013.01); *H04N 2201/3242* (2013.01); *H04N 2201/3252* (2013.01)

(58) Field of Classification Search
CPC .... H04N 23/71; H04N 1/32128; H04N 23/73; H04N 2101/00; H04N 2201/3242; H04N 2201/3252; H04N 25/533; H04N 25/583; H04N 23/741
See application file for complete search history.

(56) References Cited

U.S. PATENT DOCUMENTS

| 2010/0321525 | A1 | 12/2010 | Nagata |
| 2012/0314124 | A1 | 12/2012 | Kaizu |
| 2019/0327423 | A1* | 10/2019 | Sudo ..................... H04N 23/741 |
| 2020/0396367 | A1 | 12/2020 | Segapelli |

FOREIGN PATENT DOCUMENTS

| JP | 2010136205 A | 6/2010 |
| WO | 2020/051361 A1 | 3/2020 |

* cited by examiner

*Primary Examiner* — Twyler L Haskins
*Assistant Examiner* — Angel L Garces-Rivera
(74) *Attorney, Agent, or Firm* — CANON U.S.A., INC. IP Division

(57) ABSTRACT

An imaging apparatus includes a first output unit configured to output, outside the imaging apparatus, a first image that an image sensor, an imaging region of which is divided into a plurality of regions, has captured while an exposure condition is controlled for each of the plurality of regions, and a second output unit configured to output, outside the imaging apparatus, exposure information for each of the plurality of regions, the exposure information indicating the exposure condition to be applied to the corresponding one of the plurality of regions when the first image is captured. The second output unit is configured to complete outputting exposure information for a region to be subjected to exposure correction processing in the first image, out of the plurality of regions, before the first output unit completes outputting an image of the region to be subjected to exposure correction processing.

13 Claims, 18 Drawing Sheets

FIG.5

| EXPOSURE TIME ID | 0 | 1 | 2 | 3 | 4 |
|---|---|---|---|---|---|
| EXPOSURE TIME [S] | 1/30 | 1/60 | 1/120 | 1/240 | 1/480 |
| EXPOSURE CORRECTION COEFFICIENT | 1 | 2 | 4 | 8 | 16 |
| | A | | | | |
| | | | | | B |
| | | | | | C |

| GAIN ID | ANALOG GAIN [TIMES] | GAIN CORRECTION COEFFICIENT |
|---|---|---|
| 0 | 8 | 1 |
| 1 | 4 | 2 |
| 2 | 2 | 4 |
| 3 | 1 | 8 |

FIG.11

| | SYNCHRONIZATION CODE 1 1101 | SYNCHRONIZATION CODE 2 1102 | SYNCHRONIZATION CODE 3 1103 | IDENTIFICATION CODE 1104 | EXPOSURE INFORMATION/ BLANK CODE 1105 | OB DATA 1106 |
|---|---|---|---|---|---|---|
| BLOCK ROW 0 0th ROW | DATA FOR 16 PIXELS All_1 | DATA FOR 16 PIXELS All_1 | DATA FOR 16 PIXELS All_0 | DATA FOR 16 PIXELS EACH PIXEL 0x002 | [0,0] [1,0] [2,0] [3,0] | |
| BLOCK ROW 0 1st ROW | DATA FOR 16 PIXELS All_1 | DATA FOR 16 PIXELS All_1 | DATA FOR 16 PIXELS All_0 | DATA FOR 16 PIXELS EACH PIXEL 0x002 | [4,0] [5,0] [6,0] [7,0] | |
| ... | | | | | ... | |
| BLOCK ROW 0 4th ROW | DATA FOR 16 PIXELS All_1 | DATA FOR 16 PIXELS All_1 | DATA FOR 16 PIXELS All_0 | DATA FOR 16 PIXELS EACH PIXEL 0x002 | [16,0] [17,0] [18,0] [19,0] | |
| BLOCK ROW 0 5th ROW | DATA FOR 16 PIXELS All_1 | DATA FOR 16 PIXELS All_1 | DATA FOR 16 PIXELS All_0 | DATA FOR 16 PIXELS EACH PIXEL 0x002 | DATA FOR 16 PIXELS BLANK CODE | |
| BLOCK ROW 0 6th ROW | DATA FOR 16 PIXELS All_1 | DATA FOR 16 PIXELS All_1 | DATA FOR 16 PIXELS All_0 | DATA FOR 16 PIXELS EACH PIXEL 0x002 | DATA FOR 16 PIXELS BLANK CODE | |
| ... | | | | | | |
| BLOCK ROW 0 99th ROW | DATA FOR 16 PIXELS All_1 | DATA FOR 16 PIXELS All_1 | DATA FOR 16 PIXELS All_0 | DATA FOR 16 PIXELS EACH PIXEL 0x002 | DATA FOR 16 PIXELS BLANK CODE | |
| BLOCK ROW 1 0th ROW | DATA FOR 16 PIXELS All_1 | DATA FOR 16 PIXELS All_1 | DATA FOR 16 PIXELS All_0 | DATA FOR 16 PIXELS EACH PIXEL 0x002 | [0,1] [1,1] [2,1] [3,1] | |

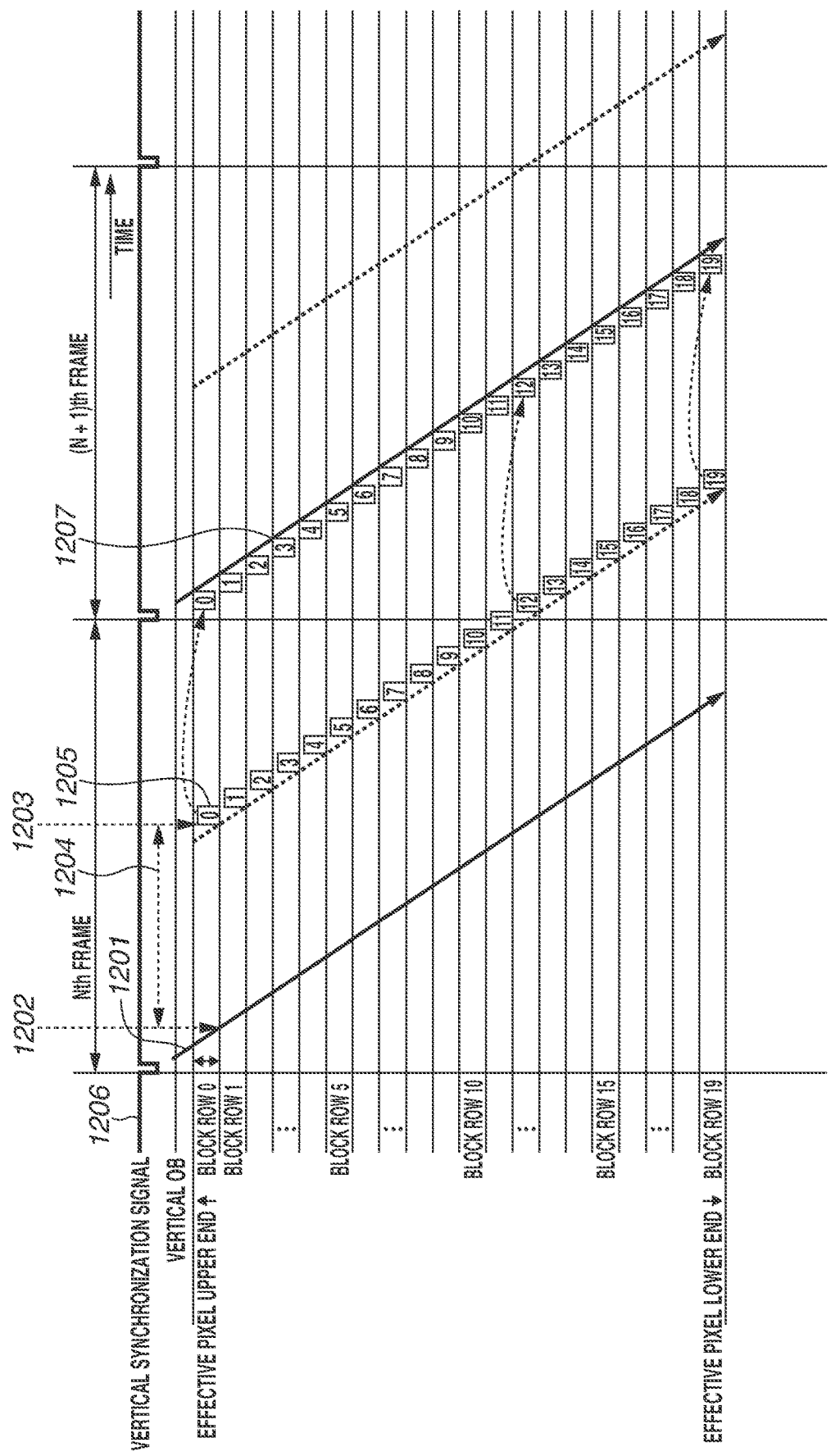

IMAGING APPARATUS, IMAGE PROCESSING SYSTEM, AND CONTROL METHOD FOR IMAGING APPARATUS

BACKGROUND OF THE INVENTION

Field of the Invention

The present invention relates to an imaging apparatus, image processing system, and a control method for an imaging apparatus.

Description of the Related Art

In general, the dynamic range of an image sensor used for a digital camera and other apparatuses is known to be narrower than the dynamic range in the natural world. For this reason, a method of expanding the dynamic range of an image sensor has been studied. Japanese Patent Application Laid-open No. 2010-136205 discusses a technique for expanding the dynamic range of an imaging sensor by determining an exposure time for each pixel from information obtained from a preliminary image capturing and then performing a main image capturing.

In Japanese Patent Application Laid-open No. 2010-136205, a gain calculation is performed on each region of an exposure image, based on an exposure amount map, to perform correction processing on an image. However, in a case where such exposure correction processing on an image is performed outside the imaging apparatus using the exposure information for each region generated in the imaging apparatus, following issues arise. In a case where exposure information for an entire region is obtained after image data for an exposure image is obtained, since the correction processing cannot be started until the exposure information is obtained, all the image data of the exposure image has to be once held. Accordingly, a large capacity buffer is necessary. Since the exposure information for each region is obtained after the exposure image, the correction processing for the image data is delayed for a time period corresponding to the delay time caused thereby. As a result, delay occurs until the desired image data is obtained from the imaging result. This is not suitable for a use, for example, in monitoring for which a premium is placed on real time responsiveness.

The present invention is directed to a technique for obtaining a high dynamic range image with a less delay without using a large capacity buffer, in a case where an exposure image, and exposure information for each region are output outside and exposure correction processing is performed outside.

SUMMARY OF THE INVENTION

According to an aspect of the present invention, an imaging apparatus includes a first output unit configured to output, outside the imaging apparatus, a first image that an image sensor, an imaging region of which is divided into a plurality of regions, has captured while an exposure condition is controlled for each of the plurality of regions, and a second output unit configured to output, outside the imaging apparatus, exposure information for each of the plurality of regions, the exposure information indicating the exposure condition to be applied to the corresponding one of the plurality of regions when the first image is captured. The second output unit is configured to complete outputting exposure information for a region to be subjected to exposure correction processing in the first image, out of the plurality of regions, before the first output unit completes outputting an image of the region to be subjected to exposure correction processing.

Further features of the present invention will become apparent from the following description of embodiments with reference to the attached drawings.

BRIEF DESCRIPTION OF THE DRAWINGS

FIG. 5 is a diagram illustrating an example of imaging conditions each with a combination of the exposure time and the analog gain.

FIG. 11 is a diagram illustrating an arrangement example of the exposure information.

FIG. 12 is a diagram illustrating timing at which the exposure information is generated.

DESCRIPTION OF THE EMBODIMENTS

Figure 1:
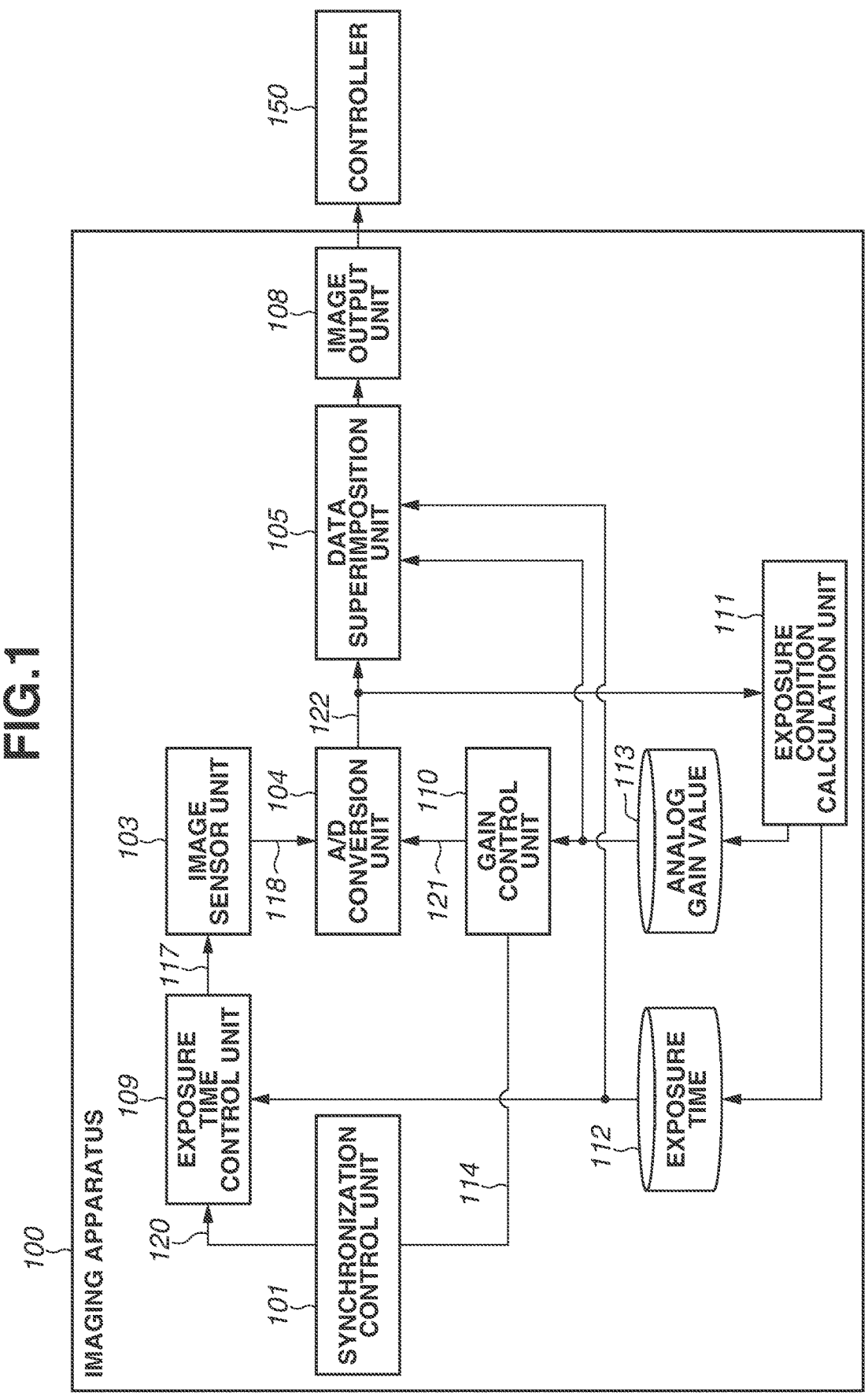
FIG. 1 is block diagram illustrating a schematic configuration of an imaging apparatus according to a first embodiment.

Hereinbelow, embodiments of the present invention will be described with reference to the accompanying drawings. Configurations described in the following embodiments are merely examples and the present invention is not limited thereto. The same components and processes are described with the same reference numerals assigned.

FIG. 1 is block diagram illustrating a schematic configuration of an imaging apparatus 100 according to a first embodiment.

While the imaging apparatus 100 according to the present embodiment includes various components which typical imaging apparatuses have, only main components of the imaging apparatus 100 according to the present embodiment are illustrated in FIG. 1, to simplify the drawings and descriptions. The components of the imaging apparatus 100 will be schematically described, starting from an image sensor unit 103.

The image sensor unit 103, the imaging region of which includes a plurality of regions, is configured to be capable of being driven dividedly for each region, and has a function of performing an exposure operation (accumulation of charge) with a different exposure time for each region. Each region is referred to as a pixel block. Details of the pixel block will be described below. In the case of the present embodiment, an exposure time of the image sensor unit 103 is set for each region by an exposure control signal 117 supplied from an exposure time control unit 109 (described below), and the exposure is performed with the exposure time set for each region. The exposure control signal 117 is a signal for setting an exposure time for each region of the image sensor unit 103. The image sensor unit 103 reads out, as a pixel potential 118, the charge accumulated in each pixel in the exposure time controlled for each region by the exposure control signal 117. The pixel potential 118 is then output to an analog to digital (A/D) conversion unit 104.

The A/D conversion unit 104 performs A/D conversion of the pixel potential 118 read out from the image sensor unit 103 to convert the analog signal into a digital value. In the present embodiment, an analog gain 121 corresponding to each region is set in the A/D conversion unit 104 by a gain control unit 110. The A/D conversion unit 104 applies the analog gain 121 for each region to the corresponding pixel potential 118 output from the image sensor unit 103, and then converts the pixel potential 118 into a digital value. Hereinbelow, an image formed by the digital signal generated by being subjected to the A/D conversion with the analog gain 121 applied to the A/D conversion unit 104 for each region, is referred to as an exposure image 122. The exposure image 122 output from the A/D conversion unit 104 is transmitted to an exposure condition calculation unit 111 and a data superimposition unit 105.

The exposure condition calculation unit 111 calculates, based on the exposure image 122, an exposure time 112 and an analog gain value 113 for each region so that the imaging condition is optimized, and updates the imaging condition. The value of the exposure time 112 for each region is transmitted to the exposure time control unit 109, and the analog gain value 113 for each corresponding region is transmitted to the gain control unit 110. The exposure time 112 and the analog gain value 113 for each region are transmitted also to the data superimposition unit 105.

A synchronization control unit 101 generates an exposure time output pulse 120 and a gain output pulse 114 synchronized with each other, outputs the exposure time output pulse 120 to the exposure time control unit 109, and outputs the gain output pulse 114 to the gain control unit 110.

The exposure time control unit 109 generates the exposure control signal 117 for each region based on the exposure time output pulse 120 and a value of the exposure time 112 for the corresponding region, and outputs the generated exposure control signal 117 to the image sensor unit 103. In this way, the exposure time corresponding to the exposure time 112 for each region is set to the image sensor unit 103.

The gain control unit 110 generates the analog gain 121 for each region to be applied to the pixel potential 118 of the corresponding region of the image sensor unit 103, based on the gain output pulse 114 and the analog gain value 113 for the corresponding region, and outputs the generated analog gain 121 for each region to the A/D conversion unit 104. In this way, the A/D conversion unit 104 performs A/D conversion after the analog gain 121 for each region is applied to the pixel potential 118 of the corresponding region. The data having been subjected to the A/D conversion is transmitted to the exposure condition calculation unit 111 and the data superimposition unit 105 as the exposure image 122 for each region.

The data superimposition unit 105 receives the exposure time 112 and the analog gain value 113 for each region and performs packing of the exposure time 112 and the analog gain value 113 as exposure information. The data superimposition unit 105 subsequently outputs the exposure information and the exposure image 122 to an image output unit 108 in an appropriate order in which an order relationship with the exposure image 122 is reflected.

The image output unit 108 receives the exposure information and the exposure image 122 from the data superimposition unit 105, and outputs the exposure information and the exposure image 122 to an external source of the imaging apparatus 100. In the example of the present embodiment, connected to the imaging apparatus 100 is a controller 150 serving as a processing module for receiving the image data from the imaging apparatus 100. In the present embodiment, a signal line connecting the image output unit 108 of the imaging apparatus 100 and the controller 150 is a low voltage differential signaling (LVDS) signal line having 16 data channels. The type and the data channel width of the signal line are not limited thereto. In the present embodiment, the image output unit 108 is merely an example of a first output unit and a second output unit, and the controller 150 is merely an example of a processing apparatus.

Figure 2:
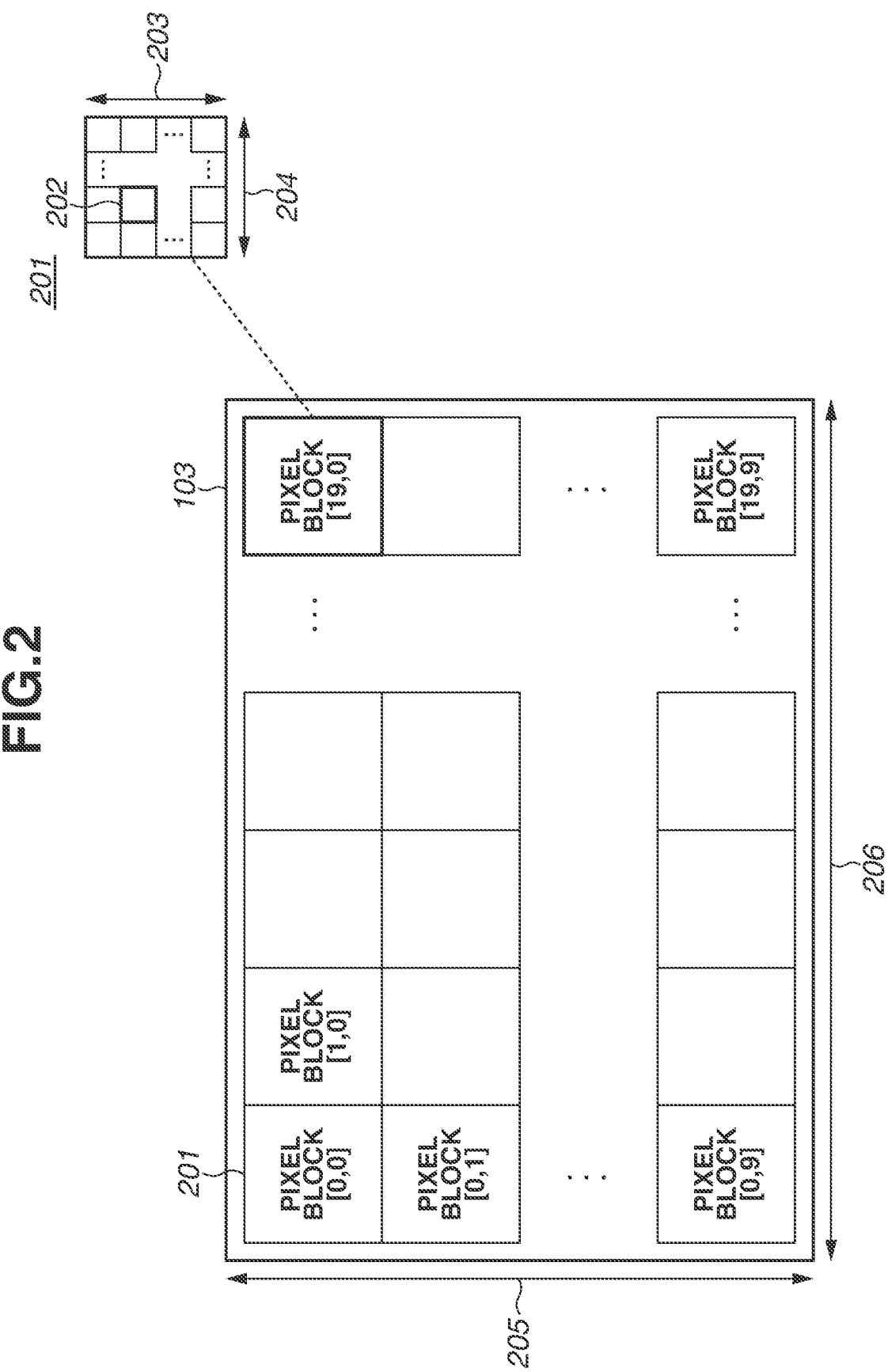
FIG. 2 is a diagram illustrating an image sensor unit.

FIG. 2 is a diagram illustrating a configuration of the image sensor unit 103.

The imaging region of the image sensor unit 103 includes a plurality of pixel blocks 201, and each of the pixel blocks 201 includes a plurality of pixels 202. In the example of the present embodiment, the number of pixels in the imaging region of the image sensor unit 103 in a width 206 direction (horizontal line direction) is 2000 pixels, and 1000 pixels in a height 205 direction, which corresponds to the number of horizontal lines in a vertical direction 1000 lines. The number of pixels in the pixel block 201 in a width 204 direction (horizontal line direction) is 100 pixels, and 100 pixels in a height 203 direction, which corresponds to the number of horizontal lines in a vertical direction 100 lines. In this case, the number of pixel blocks 201 in the imaging region of the image sensor unit 103 is 20 in the horizontal direction, and 10 in the vertical direction. Each of pixel blocks [0, 0] to [19, 9] illustrated in the pixel block 201 in FIG. 2 indicates a position of each pixel block 201 in the imaging region, and values described in the brackets, i.e., [,], indicate indexes of each pixel block 201 in the horizontal and the vertical directions in the imaging region. For example, the pixel block 201 at the upper right in the image sensor unit 103 in FIG. 2 is the pixel block [19, 0]. A group of pixel blocks that can be indicated by a same index in the vertical direction is referred to as a block row (i.e., pixel block row). More specifically, a block row N includes pixel blocks [0, N] to [19, N]. For example, a block row 5 includes pixel blocks [0, 5] to [19, 5]. The sizes of the image sensor unit 103 and the pixel block 201 (the number of pixels in the vertical and horizontal directions) are not limited to the above-descried example. The shape and the aspect ratio of the pixel 202 are not limited to the above-descried example, and, for example, the pixel 202 may not be square and may be rectangular. Further, the pixel block 201 may include only one pixel 202.

In the present embodiment, each of the pixel blocks 201 is a unit for which the exposure time and the analog gain can be controlled.

Herein, the exposure time corresponds to a time period during which charge is accumulated in each pixel (light-sensitive element) of the image sensor unit 103 at a time of image capturing. Thus, for example, if a light amount incident on the image sensor unit 103 is constant and no pixel saturation occurs, the pixel potential 118 is higher as the exposure time is longer (i.e., brighter image can be captured). More specifically, in a case where the incident light amount is constant and the saturation of the pixel is not considered, for example, a brighter image can be obtained when the exposure time is $\frac{1}{30}$ second than when the exposure time is $\frac{1}{480}$ second.

The analog gain 121 is a gain to be applied to the pixel potential 118 in the A/D conversion unit 104 at a time of image capturing. Thus, the digital pixel value (digital value obtained through the A/D conversion after the gain is applied to the pixel potential 118) output from the A/D conversion unit 104 is larger as the value of the analog gain is larger.

Referring back to FIG. 1, the configuration and the operation of the imaging apparatus 100 according to the present embodiment will be described.

The exposure time for the image sensor unit 103 is controlled in unit of pixel block 201 based on the exposure control signal 117, and the image sensor unit 103 performs image capturing. The image sensor unit 103 outputs the pixel potential 118 based on the charge accumulated in each pixel.

The A/D conversion unit 104 applies the analog gain 121 set for each pixel block of the image sensor unit 103 to the corresponding pixel potential 118 output from the image sensor unit 103, and then performs digital conversion of the pixel potential 118 to output the exposure image 122. In the present embodiment, assume that the exposure image 122 is expressed by digital values of 10 bits. The analog gain 121 can take any of four gain values of 1 time, 2 times, 4 times, and 8 times, for example.

Next, the exposure time 112 and the analog gain value 113 will be described with reference to FIGS. 3, 4, and 5.

Figure 3:
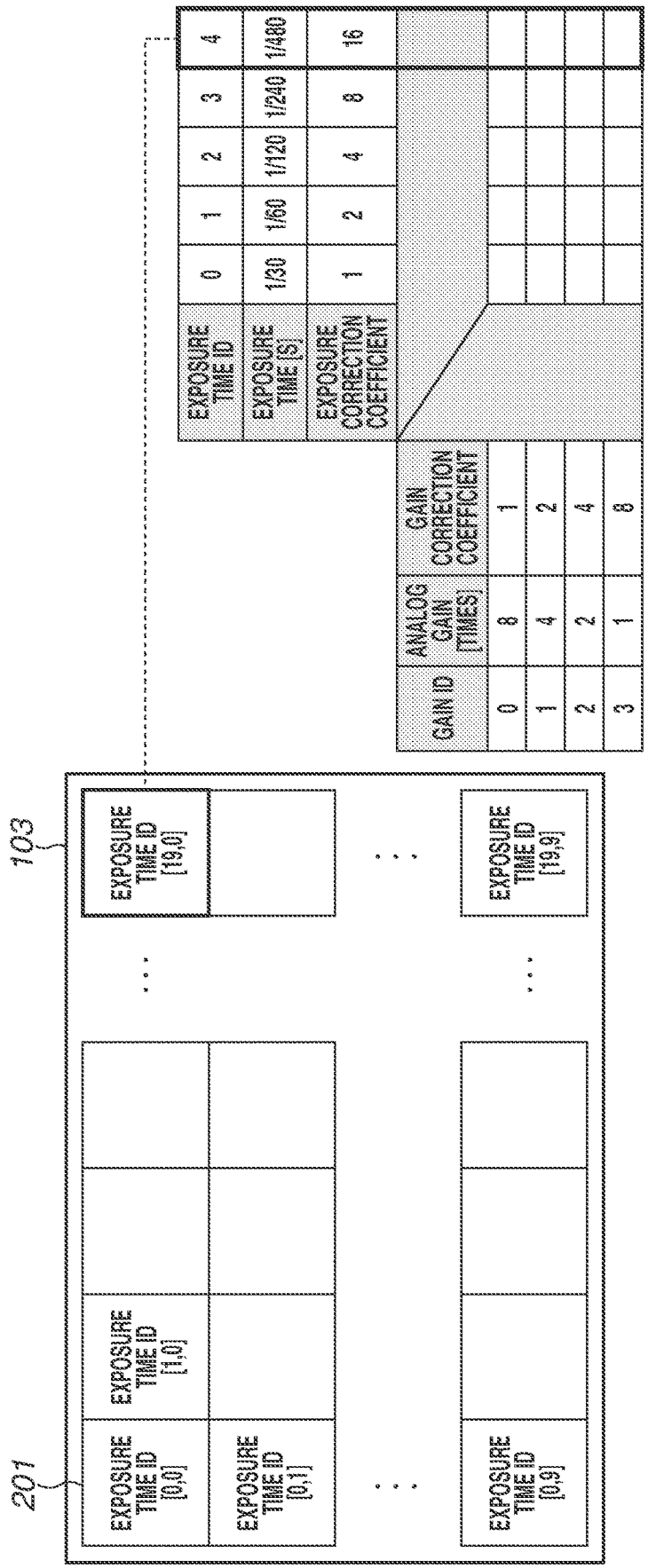
FIG. 3 is a diagram illustrating an exposure time for each region.
Figure 4:
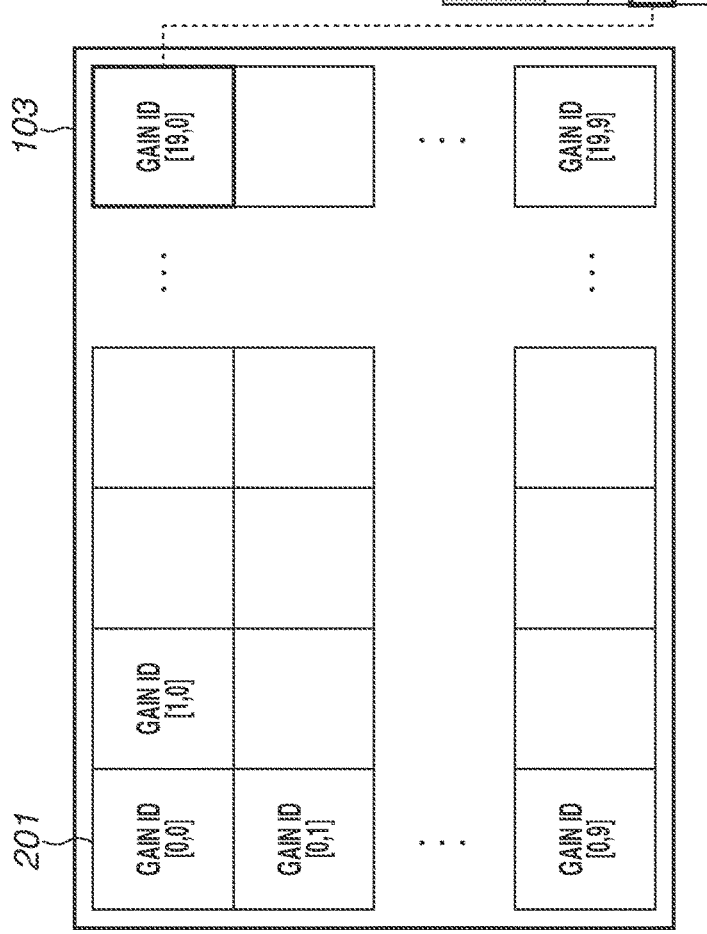
FIG. 4 is a diagram illustrating an analog gain for each region.

With reference to FIG. 3, the exposure time 112 set for each pixel block 201 will be described.

The exposure time 112 includes exposure time IDs, values of exposure times (second), and exposure correction coefficients as illustrated in FIG. 3. The exposure time ID is an index indicating an exposure time (second). The exposure time IDs [0, 0] to [19, 9] illustrated in the pixel blocks 201 in FIG. 3 indicate the exposure time IDs of the pixel blocks [0, 0] to [19, 9] illustrated in FIG. 2, respectively. In the case of the present embodiment, each index value of the exposure time ID is any one of values of 0 to 4. In the example of FIG. 3, a case where the index value of the exposure time ID [19, 0] for the pixel block [19, 0] on upper right in the imaging region is four, is illustrated. The actual exposure time (second) and the exposure correction coefficient corresponding to each exposure time ID will be described below with reference to FIG. 5.

Next, with reference to FIG. 4, the analog gain value 113 will be described. As illustrated in FIG. 4, the analog gain value 113 includes gain IDs, values of analog gains, and gain correction coefficients. Each of the gain IDs is an index indicating an analog gain. The gain IDs [0, 0] to [19, 9] illustrated in the pixel blocks 201 in FIG. 4 indicate the gain IDs for the pixel blocks [0, 0] to [19, 9] illustrated in FIG. 2, respectively. In the case of the present embodiment, each index value of the gain ID is any one of 0 to 3. In the example of FIG. 4, a case where the index value of the gain ID [19, 0] for the pixel block [19, 0] on upper right in the imaging region is two, is illustrated. The actual analog gain and the gain correction coefficient corresponding to each gain ID will be described below with reference to FIG. 5.

Next, with reference to FIG. 5, each of the exposure time IDs, the corresponding exposure time, and the exposure correction coefficient will be described. As described above, the exposure time ID takes a value from 0 to 4 as an index value. The index value 0 of the exposure time ID corresponds to $\frac{1}{30}$ second of the exposure time [s]. Similarly, the index value 1 of the exposure time ID corresponds to $\frac{1}{60}$ second of the exposure time [s], the index value 2 corresponds to $\frac{1}{120}$ second, the index value 3 corresponds to $\frac{1}{240}$ second, and the index value 4 corresponds to $\frac{1}{480}$ second. The exposure time is one of parameters related to the imaging condition, and in the present embodiment, the index value of the exposure time ID that is a condition under which the brightest image is obtainable is set to 0. If a light amount incident on the image sensor unit 103 is constant and no pixel saturation occurs, when the exposure time changes from $\frac{1}{30}$ second to $\frac{1}{480}$ second, the brightness at the time of image capturing is 1 time to $\frac{1}{16}$ times with the exposure time $\frac{1}{30}$ second as a reference, with which the brightest image is obtainable. For example, the brightness at a time of image capturing when the exposure time is $\frac{1}{480}$ second corresponding to the index value 4 of the exposure time ID becomes $\frac{1}{16}$ times ($=(\frac{1}{480})$ second $\div (\frac{1}{30})$ second) compared with that when the exposure time is $\frac{1}{30}$ second corresponding to the index value 0 of the exposure time ID.

The exposure correction coefficient is used to match levels of pixel values with each other in a case where the image capturing is performed with each exposure time corresponding to the respective exposure time ID, as described above. In the case of the present embodiment, the exposure correction coefficient is used so as to match the level of each pixel value at a corresponding exposure time (any one of $\frac{1}{30}$ second to $\frac{1}{480}$ second) to a level of the pixel value in a case where the image capturing is performed with the exposure time $\frac{1}{30}$ second at which the brightest image is obtainable, as the reference. Thus, an inverse number of the ratio of the brightness at the image capturing is used as the exposure correction coefficient. As described above, with the exposure time $\frac{1}{30}$ second at which the brightest image is obtainable as the reference, since the brightness obtained with the exposure time $\frac{1}{30}$ second to $\frac{1}{480}$ second changes from 1 time to $\frac{1}{16}$ times, the exposure correction coefficient changes from 1 time to 16 times, each of which is the inverse number of the brightness illustrated in FIG. 5.

Next, with reference to FIG. 5, each of the gain IDs, the corresponding analog gain, and the gain correction coefficient will be described. As described above, the gain ID takes a value from 0 to 3 as an index value. The index value 0 of the gain ID corresponds to the analog gain of 8 times. Similarly, the index value 1 of the gain ID corresponds to the analog gain of 4 times, the index value 2 corresponds to the analog gain of 2 times, and the index value 3 corresponds to the analog gain of 1 time. The analog gain is one of the parameters related to the imaging condition as in the exposure time described above, and in the present embodiment, the index value of the gain ID that is a condition to be able to obtain the brightest image is set to 0.

As described above, the gain correction coefficient is used to match the levels of pixel values with each other when each analog gain corresponding to the gain ID is applied. In the case of the present embodiment, the gain correction coefficient is set so that the level of each pixel value is matched with the corresponding analog gain (any one of 8 times to 1 time) with the level of the pixel value as a reference, in a case where the analog gain is 8 times with which the brightest image is obtainable. Thus, as illustrated in FIG. 5, the gain correction coefficients are from 1 time to 8 times with respect to the analog gains 8 times to 1 time, which are inverse to each other.

Next, with reference to FIG. 5, a combination of an exposure time (second) and an exposure correction coefficient corresponding to each exposure time ID, and an analog gain and a gain correction coefficient corresponding to each gain ID will be described.

The exposure time and the analog gain are the parameters related to the imaging condition as described above, and in the case of the present embodiment, each of the index values for the exposure time ID and the gain ID that is a condition under which the brightest image is obtainable is set to zero. Thus, for example, a combination of the index value zero of the exposure time ID (exposure time 1/30 second) and the index value zero of the gain ID (analog gain 8 times) indicated by A in FIG. 5 is a condition under which the brightest image is captured. Hereinbelow, the setting of the imaging condition with this combination is referred to as an imaging condition setting A.

On the other hand, a combination of the largest index values of the exposure time ID and the gain ID is a condition under which the darkest image is captured, which is indicated by C in FIG. 5. Hereinbelow, the setting of the imaging condition with this combination is referred to as an imaging condition setting C. Each combination of the analog gain and the exposure time is merely an example and it is not limited thereto. A combination example indicated by B in FIG. 5 (referred to as an imaging condition setting B) will be described below.

The image output unit 108 illustrated in FIG. 1 outputs the exposure image 122 for each region. The image is output with the brightness based on the exposure information for the corresponding region. The exposure information for each region is the combination of the exposure time ID and the gain ID described in conjunction with FIGS. 3 and 4. Thus, the controller 150 that has received the exposure image 122 needs to correct the exposure condition for each region to generate an image desired by the user. For example, in a case where the user wants an image in which the brightness smoothly changes in the entire captured image region, exposure correction processing for each region is to be performed on the entire image region of the captured image using the exposure information corresponding to the region. Hereinbelow, the method of performing the exposure correction processing for each region by the controller 150 in such a case will be described in detail using, as an example, the imaging condition settings A, B, and C illustrated in FIG. 5, with reference to FIGS. 6, 7, and 8.

Figure 6:
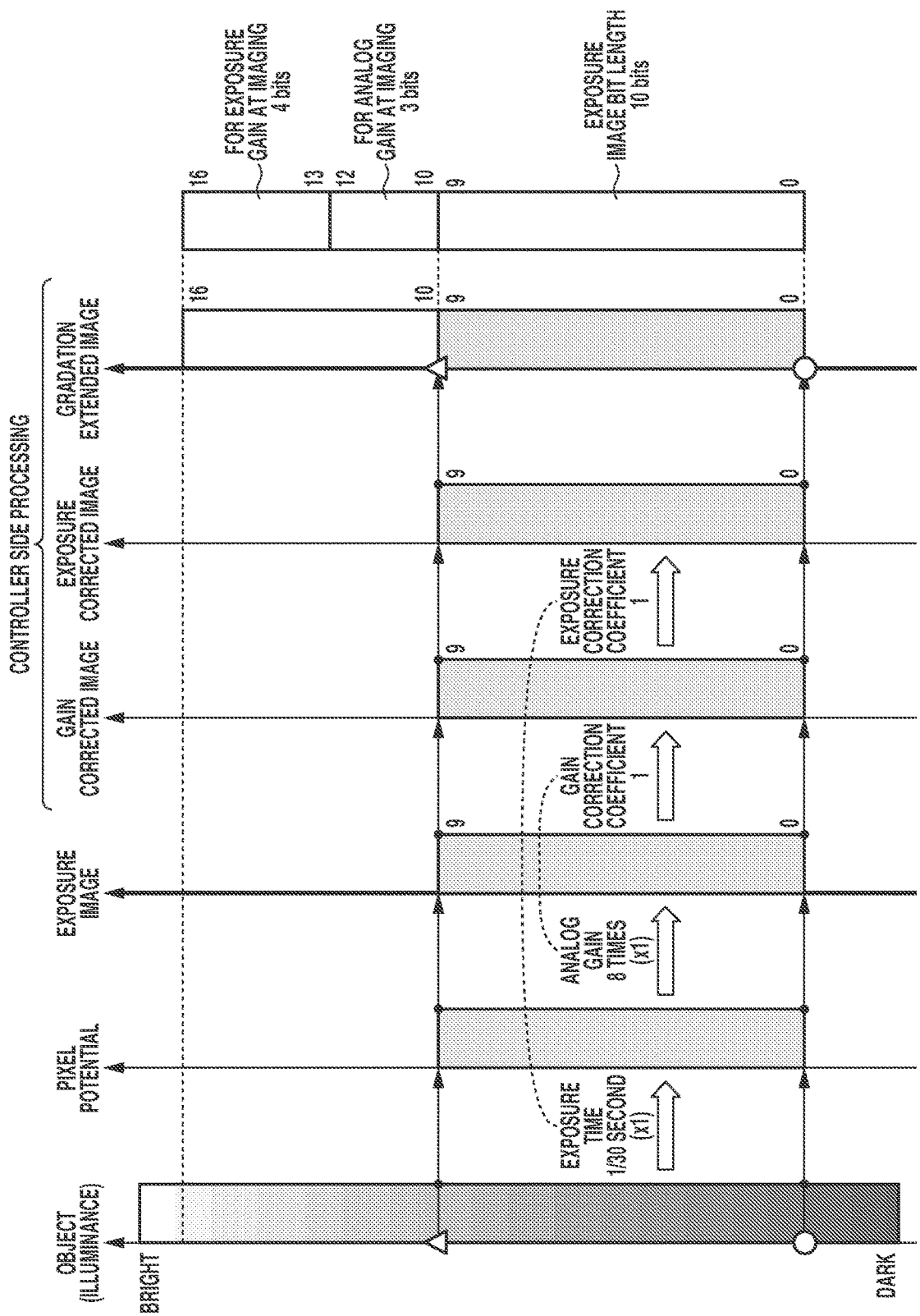
FIG. 6 is a diagram illustrating exposure correction processing with an imaging condition setting A with which the brightest image is captured.

With reference to FIG. 6, a description will be provided of exposure correction processing for each region in a case of the setting with which the brightest image is captured (imaging condition setting A in FIG. 5).

FIG. 6 is a diagram illustrating a brightness (illuminance) of an object, a pixel potential, an exposure image, a gain corrected image, an exposure corrected image, and a gradation extended image, on respective axes each indicating a brightness direction. FIG. 6 illustrates processes from when an image is captured to when the gradation extended image is output. The gain corrected image, the exposure corrected image, and the gradation extended image are obtained through the processing of the controller 150 side. In the example of FIG. 6, the setting for capturing the brightest image of the object (imaging condition setting A in FIG. 5) is set as a reference setting, and in this setting, each axis is normalized with the lowest illuminance value (indicated by circles in FIG. 6) and the highest illuminance value (indicated by triangles in FIG. 6) as references. The values on the axes for the object, the pixel potential, and the exposure image are different in unit. However, in order to simplify the description in a case where the settings are changed in FIGS. 7 and 8 described below, values corresponding to the lowest illuminance and the highest illuminance are illustrated to align in the horizontal direction in FIG. 6.

Hereinbelow, a description will be provided of shifts of each value in the processes from when the image of the object is captured to when the gradation extended image is output.

As described above, the imaging condition setting A illustrated in FIG. 5 is the combination for capturing a brightest image. In the case of the imaging condition setting A, the image sensor unit 103 captures an image of an object with the exposure time of 1/30 second, and the A/D conversion unit 104 applies the gain of 8 times to the pixel potential output from the image sensor unit 103 to perform A/D conversion. In the following descriptions, the brightness with which an image can be captured with the imaging condition setting A that is a condition to obtain the brightest image is referred to as a "reference brightness". The exposure image obtained by performing A/D conversion on the pixel potential is of 10 bit digital value as described above.

The A/D conversion unit 104 performs A/D conversion using the analog gain of 8 times according to the above-described imaging condition setting A. Since the gain correction coefficient in a case where the analog gain of 8 times is applied is one, the gain corrected image in the controller 150 becomes an image to which the gain correction coefficient of 1 time is applied. In the example of FIG. 6, the image sensor unit 103 performs image capturing with the exposure time 1/30 second according to the imaging condition setting A. Since the exposure correction coefficient is one in a case where the exposure time is 1/30 second, the exposure corrected image in the controller 150 is an image to which the exposure correction coefficient (1 time) is applied.

The exposure image is obtained by capturing an image for each region of the image sensor unit 103 with the combination of various imaging conditions illustrated in FIG. 5 described above. Thus, the controller 150 matches the levels of the pixel values of the images for respective regions with each other. However, to match the levels of the regions of the image with each other, 4 bits corresponding to each exposure time described above are further necessary in addition to the number of bits (10 bits) for the exposure image, and 3 bits corresponding to each analog gain is further necessary. More specifically, as illustrated in FIG. 5, since the exposure time ranges from 1/30 second to 1/480 second, for example, in order to match the brightness of an image captured with the exposure time 1/480 second to the reference brightness of the image captured with the exposure time 1/30 second, the pixel value needs to be increased 16 times. This corresponds to +4 bits ($16=2^4$). Similarly, as illustrated in FIG. 5, since the analog gain has a width of 8 times to 1 time, for example, in order to match the brightness obtained with the analog gain of 1 time to the reference brightness with the analog gain of 8 times, the pixel value needs to be increased 8 times.

This corresponds to +3 bits ($8=2^3$). Thus, the controller 150 generates a gradation extended image of 17 bits (=10+4+3) obtained by performing bit extension processing on the exposure corrected image (10 bits) to match the levels of the regions with each other.

As in the example of FIG. 6, it can be understood that the processing from capturing the object image to outputting the gradation extended image in the setting for capturing the brightest image (imaging condition setting A) corresponds to the processing of mapping the dark side of the object onto the lower bit side of the gradation extended image, and is suitable for capturing the object in the dark area.

Figure 7:
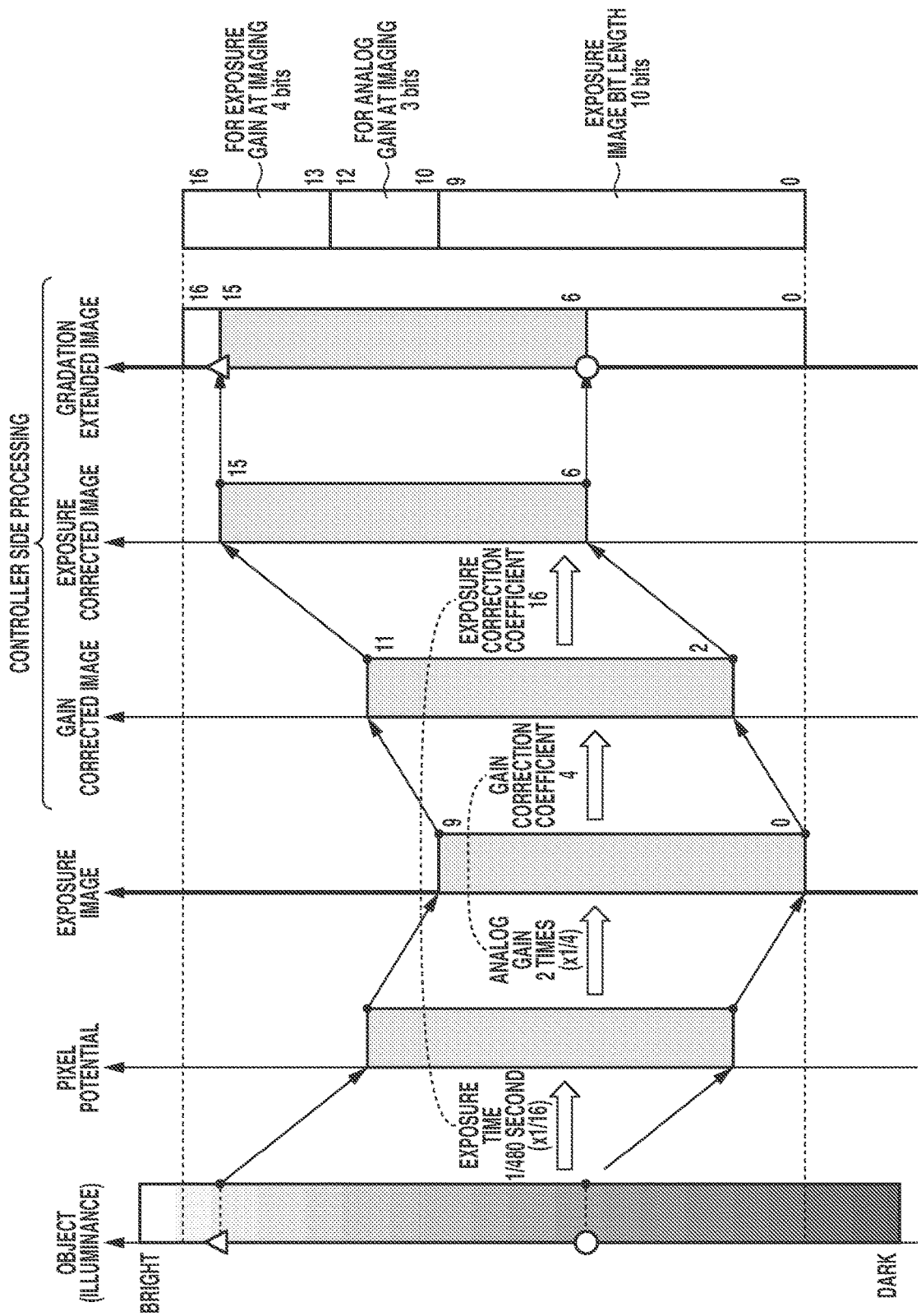
FIG. 7 is a diagram illustrating exposure correction processing with an imaging condition setting B.

Next, with reference to FIG. 7, an example of a case where the exposure time is 1/480 second and the analog gain is 2 times (i.e., imaging condition setting B in FIG. 5) will be described. FIG. 7 is illustrated in a manner similar to FIG. 6.

In FIG. 7, the exposure time of 1/480 second is a time corresponding to 1/16 times of the reference exposure time (1/30 second) described above. Accordingly, in a case where the brightness (illuminance) of the object is the same as that when the image capturing is performed with the reference exposure time (1/30 second), the pixel potential obtained in a case where the object is captured with the exposure time of 1/480 second becomes 1/16 times of the pixel potential in a case where the object is captured with the reference exposure time (1/30 second). In the imaging condition setting B, the analog gain is 2 times, which is the gain of 1/4 times of the reference analog gain (8 times). Accordingly, the exposure image obtained in a case where the analog gain is 2 times becomes an image with the 1/4 times level of the exposure image obtained in the case of the reference analog gain (8 times). As a result, in the case of the imaging condition setting B illustrated in FIG. 5, the value of the object on the bright side is mapped into the 10 bits of the exposure image.

Next, the controller 150 matches the value of the exposure image for each region with the level of that in the case of the reference imaging condition (exposure time 1/30 second and analog gain 8 times). In the case of the imaging condition setting B (exposure time 1/480 second and analog gain 2 times), as illustrated in FIG. 5 described above, the gain correction coefficient is four (=8 times÷2 times) and the exposure correction coefficient is 16 (=(1/30) second÷(1/480) second). Accordingly, when the gain correction coefficient of four and the exposure correction coefficient of 16 are applied to the exposure image, the exposure corrected image is mapped onto the upper bit side by 6 bits ($4 \times 16=2^6$) with respect to the exposure image. As a result, the exposure image is mapped from the 6th bit to the 15th bit in the 17 bits for the gradation extended image.

In other words, as in the example of FIG. 7, in the case of the imaging condition setting B (exposure time 1/480 second and the analog gain 2 times), relatively bright side of the object is mapped in the gradation extended image.

Figure 8:
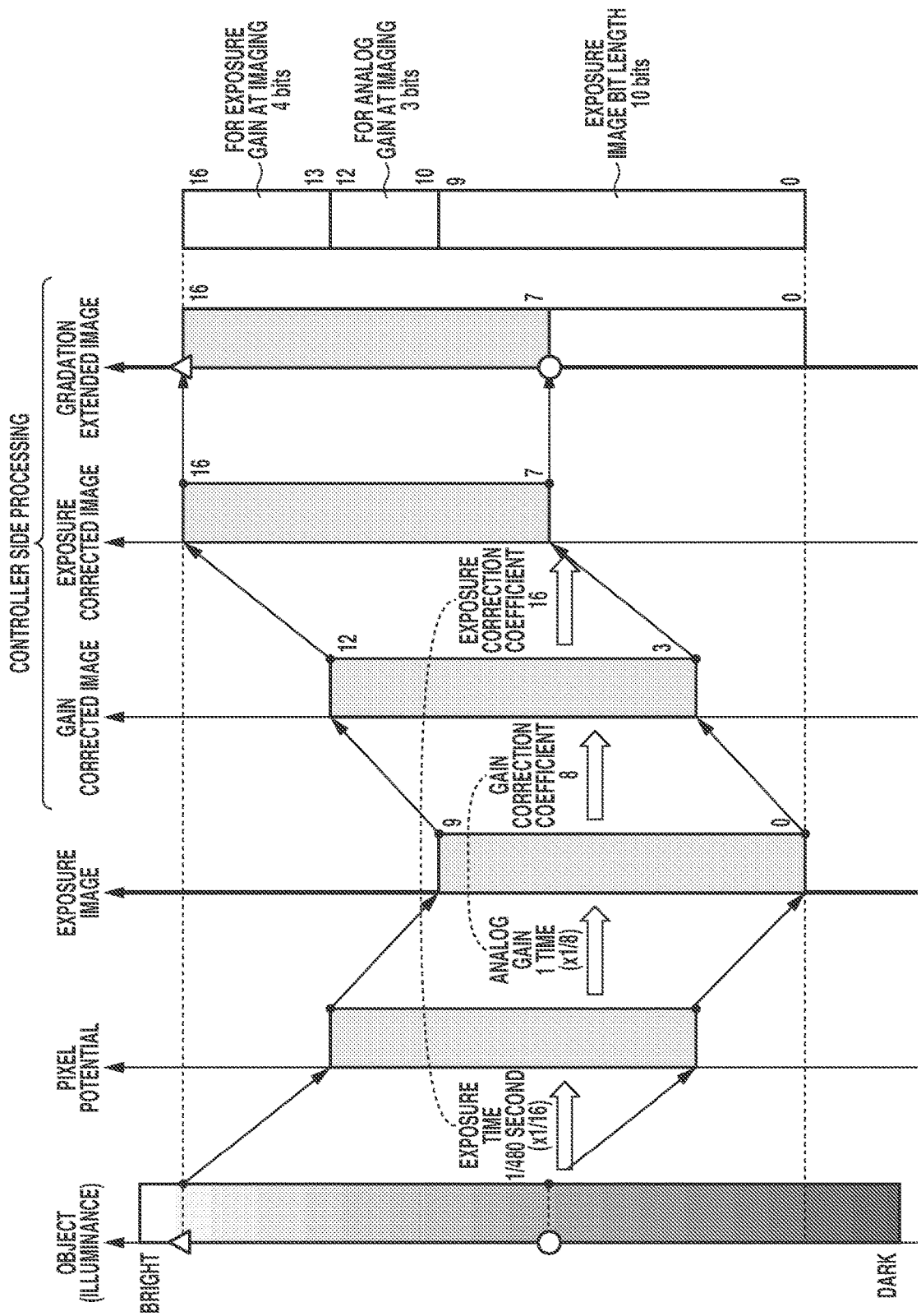
FIG. 8 is a diagram illustrating exposure correction processing with an imaging condition setting C with which the darkest image is captured.

Next, with reference to FIG. 8, an example case where the exposure time is 1/480 second and the analog gain is 1 time (i.e., imaging condition setting C for obtaining the darkest image in FIG. 5) will be described. FIG. 8 is also illustrated in a manner similar to FIGS. 6 and 7.

As described above in conjunction with FIG. 7, since the exposure time of 1/480 second is a time of 1/16 times of the reference exposure time 1/30 second, the pixel potential in the case of the exposure time of 1/480 second is 1/16 times of the pixel potential in the case of the reference exposure time of 1/30 second. In the case of the imaging condition setting C, the analog gain is 1 time and is the gain of 1/8 times of the reference analog gain of 8 times. Accordingly, the exposure image obtained in a case where the analog gain is 1 time becomes an image with the level of 1/8 times of the exposure image obtained in the case of the reference analog gain (8 times).

Also in the example of FIG. 8, the controller 150 matches the value of the exposure image for each region to the level in the case of the reference imaging condition (exposure time 1/30 second and analog gain 8 times). In the case of the imaging condition setting C (exposure time 1/480 second and analog gain 1 time), as illustrated in FIG. 5 described above, the gain correction coefficient is eight (=8 times÷1 time) and the exposure correction coefficient is 16 (=(1/30) second÷ (1/480) second).

Thus, as in the example of FIG. 8, in the case of the imaging condition setting C (exposure time 1/480 second and analog gain 1 time), the bright side of the object is mapped into the most upper bit side (7th to 16th bit) of the gradation extended image.

As described above in conjunction with FIGS. 6 to 8, the controller 150 in FIG. 1 performs processing of converting the exposure image 122 for each region (10 bits) into the gradation extended image (17 bits).

The controller 150 further performs gradation conversion processing such as a gamma conversion based on the bit depth of the image to be used at subsequent stages. However, details are not described herein.

As described in conjunction with FIGS. 6 to 8, in the case where the user wants an image in which brightness smoothly changes in the entire captured image region, the exposure correction processing is to be performed on the entire image region of the captured image for each region using the exposure information for the corresponding region. In this case, the exposure information is to be appropriately applied for the region to the exposure image of the corresponding region. The exposure information to be applied to a certain region to perform correction processing for each region is desirably transmitted to the controller 150 before the image data of the entire region to be subjected to the correction processing with the exposure information is transmitted to the controller 150. In this way, the controller 150 side is only to store the image data of the region to be corrected with the exposure information. Since the correction processing can be started each time the image data of the region to be corrected with the exposure information becomes completed, the delay of the image to be generated by the controller 150 can be reduced. Hereinbelow, the transmission of the exposure information for each region from the imaging apparatus 100 to the controller 150 side according to the present embodiment will be described with reference to FIGS. 9 to 12.

Figure 9:
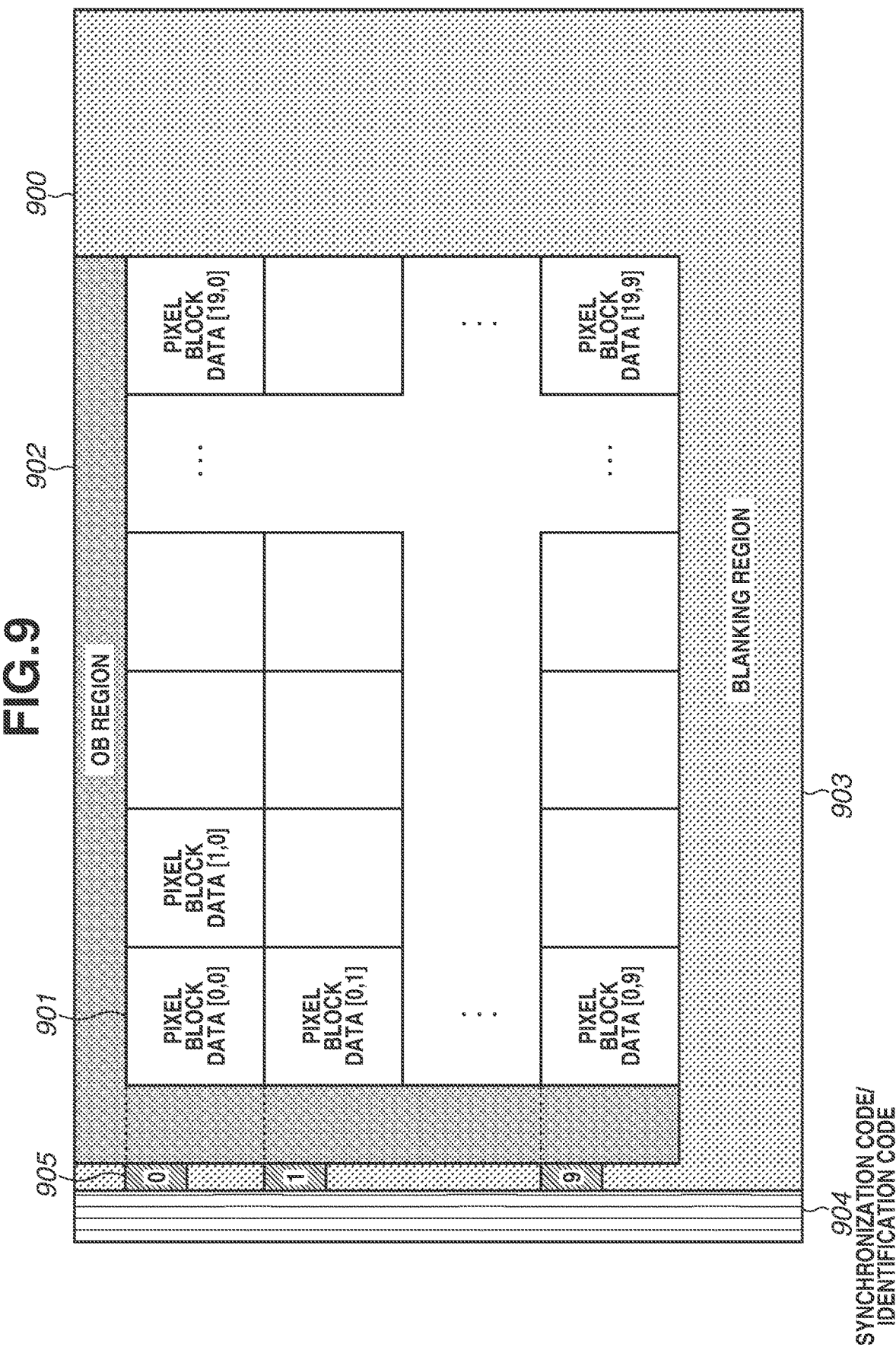
FIG. 9 is a diagram illustrating an arrangement order of pieces of image data when the pieces of image data are output.

FIG. 9 is a diagram illustrating an arrangement order of pieces of the image data when the pieces of the image data are output from the image output unit 108 of the imaging apparatus 100 to the controller 150. The data superimposition unit 105 generates the pieces of image data arranged in the order as illustrated in FIG. 9, and transmits the image data to the image output unit 108, and then the image output unit 108 transmits the image data to the controller 150. All the transmission data of the image in one frame to be transmitted in synchronization with the vertical synchronization signal is illustrated as frame data 900. The frame data 900 includes pieces of pixel block data 901 each constituting the exposure image for each region, optical black (OB) region data 902, a blanking region 903, and a synchronization code/identification code 904. Exposure information 905 corresponding to the exposure image for each region is located at a position illustrated in FIG. 9 in each block row by the data superimposition unit 105. The frame data 900 is output from the image output unit 108 to the controller 150 in a raster scan order of left to right, and upper to lower. Hereinbelow, each piece of data will be described.

The pixel block data 901 obtained by the exposure with the exposure time controlled for each region is illustrated in FIG. 9 for each region corresponding to the pixel block 201 in FIG. 2. For example, the image data captured in the region indicated by the pixel block [0, 0] in FIG. 2 is output as the pixel block data [0, 0].

The OB region data 902 is image data corresponding to the OB region, which is shielded from light, of the image sensor unit 103. The OB region data 902 is used, for example, for detecting a dark current component of a sensor pixel and detecting an amount of offset overlapped on the image.

The synchronization code/identification code 904 is a particular data string attached to indicate a beginning of valid data and/or a position of a top row when the data is transmitted from the image output unit 108 to the controller 150 through an output signal line. The controller 150 analyzes the arrangement order of the pieces of data obtained through the output signal line and starts interpreting the subsequent data as significant data, by detecting the data indicating the beginning of the valid data. The controller 150 detects the beginning of the frame data by detecting the identification code indicating the top row, and determines the operation thereafter.

In the blanking region 903, blank data indicating a blank period that does not include meaningful data is output. In the frame data 900 obtained by the image output unit 108, the blank data is output for a data portion other than the pixel block data 901, the OB region data 902, and the synchronization code/identification code 904.

The exposure information 905 is exposure information used for performing correction processing of the exposure image for each region by the controller 150. In the example illustrated in FIG. 9, the exposure information 905 is superimposed on the blank period (blanking region) before the pixel block data for each row in the exposure image. More specifically, the exposure information 905 is superimposed on the blanking region 903 between the synchronization code/identification code 904 and the OB region data 902. In FIG. 9, the exposure information 905 to which one of numerals 0 to 9 is added is exposure information applied to the pixel blocks included in the corresponding one of block rows 0 to 9. The exposure information 905 for the entire one frame is not transmitted together, but the exposure information 905 is divided to correspond to each block row and arranged. The exposure information 905 is superimposed over several pixel rows at the head position of each block row.

Figure 10:
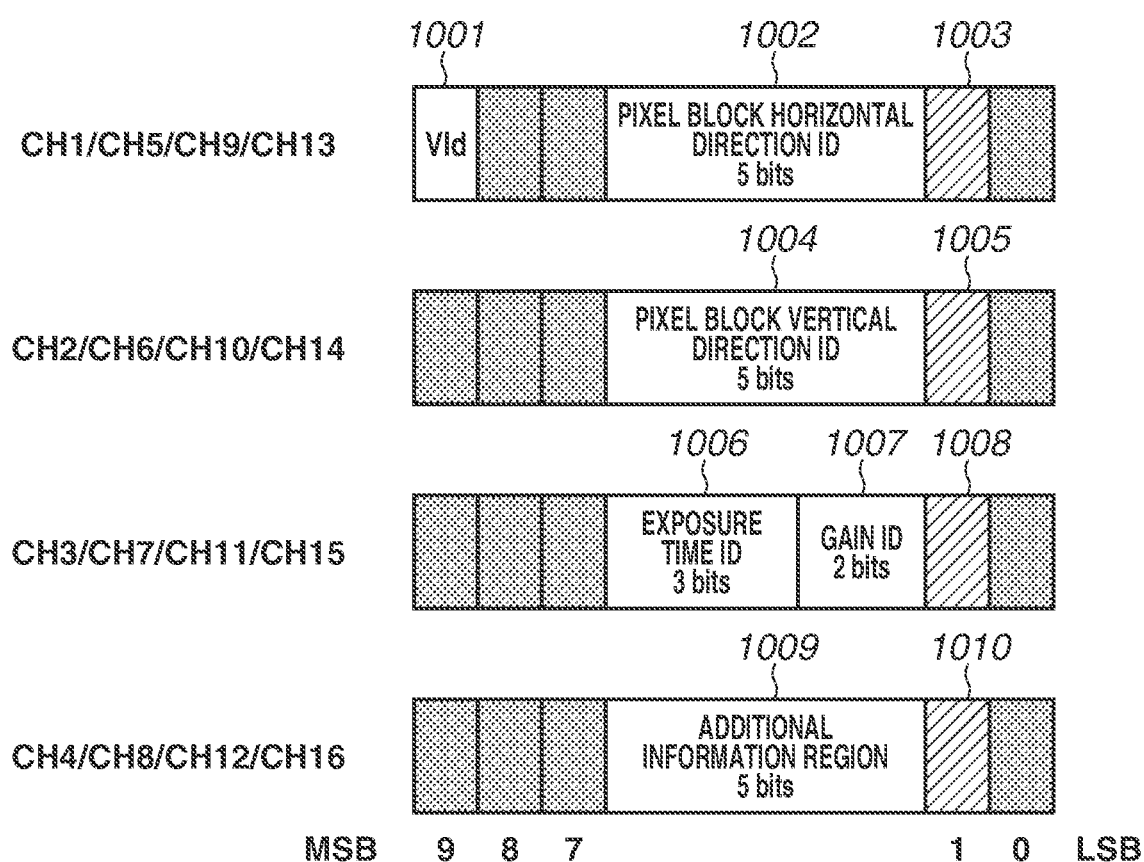
FIG. 10 is a diagram illustrating an example of exposure information.

In FIG. 10, an example of the exposure information 905 is illustrated. As described above, in the present embodiment, the signal line connecting the image output unit 108 and the controller 150 is the LVDS signal line having 16 data channels. As described above, the exposure image 122 for each region is set to 10 bit digital value and the image data for 1 pixel is transmitted and received using 10 cycles through each data channel Through each channel, the data is output from the most significant bit (MSB) to the least significant bit (LSB), from bit 9 to bit 0. In the case of the present embodiment, the image data for 16 pixels is transmitted through 16 data channels in parallel.

As illustrated in FIG. 10, the exposure information for each region is transmitted using each channel Through channels 1, 5, 9, and 13, a valid flag 1001, which indicates that the exposure information to be transmitted is valid, a pixel block horizontal direction ID 1002, and an inverted value 1003 of the LSB in the pixel block horizontal direction ID 1002 are packed in 10 bits and transmitted. The valid flag 1001 is set to one in a case where the information to be transmitted is valid (i.e., valid exposure information exists).

Through the channels 2, 6, 10, and 14, a pixel block vertical direction ID 1004 and an inverted value 1005 of the LSB in the pixel block vertical direction ID 1004 are packed and transmitted.

Through the channels 3, 7, 11, and 15, an exposure time ID 1006 of 3 bits, a gain ID 1007 of 2 bits, and an inverted value 1008 of the LSB in the gain ID 1007 are packed and transmitted. Through the channels 4, 8, 12, and 16, additional information 1009 of 5 bits and an inverted value 1010 of the LSB in the additional information 1009 are packed and transmitted. The additional information 1009 can include, for example, a value indicating a relationship of information about the current frame with that of a previous frame (whether it is the same data or how the value changes). In FIG. 10, other bits are dummy data, and they can be any values of 0 or 1. These packings are performed by the data superimposition unit 105.

Each channel has any one of the inverted values 1003, 1005, 1008, and 1010, because if all the values of the 10 bits become zero, there is a possibility that the exposure information cannot be distinguished from the synchronization code and the like. In this example, since the exposure image 122 for each region is of 10-bit digital value, the packing is performed in the format as illustrated in FIG. 10. However, the format of packing, for example, each ID data position, is not limited to the example described above. The additional information includes 5 bits, but the number of bits is not limited to 5 bits.

The arrangement of the exposure information indicated by the exposure information 905 in FIG. 9 will be described taking the exposure information regarding the block row zero and the data therearound as an example, with reference to FIG. 11. FIG. 11 illustrates data sequentially from the left end data beginning with the synchronization code one to the OB region data in the image data arrangement in the 0th row (i.e., 0th pixel row) and the subsequent rows consisting of 100 pixel rows, i.e., from 0th row to 99th row. Each of a synchronization code 1 (1101), a synchronization code 2 (1102), a synchronization code 3 (1103), an identification code 1104, and an exposure information/blank code 1105 illustrated in FIG. 11 corresponds to data transmitted and received in one cycle.

The synchronization code 1 (1101), the synchronization code 2 (1102), and the synchronization code 3 (1103) indicate the beginning of the data row using these three particular data arrangement. The subsequent identification code 1104 indicates that it is the beginning of a frame row, a block row, or the like. The exposure information/blank code 1105 is arranged at the position subsequent thereto. The pieces of exposure information corresponding in number to pixel blocks included in the block row (block row 0 in this case) are sequentially packed at this position from the top of the block row, from the 0th row of the block row 0.

Here, the pieces of exposure information for the pixel blocks with the horizontal direction IDs 0 to 3 in the block row 0 are arranged in the 0th row of the block row 0. More specifically, the pieces of exposure information for pixel blocks [0, 0], [1, 0], [2, 0], and [3, 0] are arranged therein. In this case, the exposure information for one pixel block is expressed using data corresponding to 4 pixels. Accordingly, for example, the exposure information for the pixel block [0, 0] is arranged at the position corresponding to the channels 1 to 4 in the 16 data channels, and the exposure information for the pixel block [1, 0] is arranged at the position corresponding to the channels 5 to 8. The exposure information for the pixel block [2, 0] is arranged at the position corresponding to the channels 9 to 12, and the exposure information for the pixel block [3, 0] is arranged at the position corresponding to the channels 13 to 16. Similarly, in the 1st row of the block row 0, the pieces of exposure information for the pixel blocks with the horizontal direction IDs 4 to 7 in the block row 0 are disposed.

In the present embodiment, since the number of pixel blocks included in one block row is 20 blocks, the exposure information for each pixel block is included in the 0th row to the 4th row of each block row. In the present embodiment, the respective pieces of exposure information is one illustrated in FIG. 10, and the information for the channels 1 to 4 (CH 1 to CH 4) is embedded at a position indicated by [0, 0] in FIG. 11. Similarly, information for channels 5 to 8 (CH 5 to CH 8) illustrated in FIG. 10 is embedded at a position indicated by [1, 0] in FIG. 11. In the 5th row of the block row and the subsequent rows, no exposure information to be transmitted is present, so that a blank code is embedded therein. Since one block row includes 100 pixel rows, a blank code, not the exposure information, is embedded in each of the 5th to 99th rows of the block row. From the beginning (0th row) of the next block row, the pieces of exposure information for the pixel blocks in the next block row are embedded at these positions. In the example of the present embodiment, while the OB region data 1106 is arranged immediately subsequent to the exposure information, a plurality of pieces of blank data may be present between the exposure information and the OB data.

Next, timing at which the exposure information is generated will be described with reference to FIG. 12. FIG. 12 illustrates the timing at which the exposure information is generated. FIG. 12 schematically illustrates processing timings regarding the image data of the Nth frame and the (N+1)th frame. In FIG. 12, the horizontal direction indicates a flow of time. The vertical direction corresponds to vertical direction regions in the image.

When a vertical synchronization signal 1206 is input, the pixel data is sequentially read out from the upper direction pixel (from upper direction in the image) in the image sensor unit 103, in accordance with the pixel reading timing of the Nth frame indicated by a diagonal solid line arrow 1201 in FIG. 12. In the present embodiment, since the rolling shutter method is used, the vertical OB region (VOB) is read out first, and then pixel data for each pixel is sequentially read out from the 0th row to the 99th row in the pixel blocks of the block row 0.

At a time 1202, reading of the pixel data of the pixel blocks in the block row 0 in the Nth frame is completed. Thus, all the pixel data is read out from the pixel blocks in the block row 0, so that the exposure information to be used for the (N+1)th frame starts to be generated.

The exposure information generated using the pixel data of the exposure images in the Nth frame, which is one frame previous to the (N+1)th frame, is the exposure information to be applied to the image capturing of the (N+1)th frame. Thus, the time 1202 is a generation start timing of the exposure information using the exposure images in the block row 0 in the Nth frame. This means that, with reference to FIG. 1, all the pixel data in the block row 0 in the exposure image 122 is input to the exposure condition calculation unit 111. The exposure condition calculation unit 111 generates the exposure information to be applied to the pixel blocks of the block row 0 in the (N+1)th frame from the exposure image of block row 0 in the Nth frame, using a time period 1204 illustrated in FIG. 12.

At a time 1203, at which the time period 1204 has elapsed since the time 1202, the exposure condition calculation unit 111 completes generating the exposure information using the exposure images of the block row 0 in the Nth frame. At the timing of the time 1203, the exposure information 1205 to be applied to the pixel blocks of the block row 0 in the next (N+1)th frame is generated. The exposure information generated based on the Nth frame exposure image is schematically illustrated in such a manner that the number indicating each block row is enclosed by a square in FIG. 12. The exposure information generated by the exposure condition calculation unit 111 is accumulated, as the exposure time 112 and the analog gain value 113, for each region each time the generation is completed.

As understood from FIG. 12, the exposure information 1205 to be applied to the pixel blocks of the block row 0 in the (N+1)th frame has been generated before the pixel readout timing of the (N+1)th frame indicated by a diagonal solid line arrow 1207. Thus, the data superimposition unit 105 can read out in advance the generated exposure information 1205 before the exposure images of the block row 0 in the (N+1)th frame is received from the A/D conversion unit 104, as indicated by a dotted curved line in FIG. 12. Reading out in advance the exposure information 1205 thus generated enables transmission of the exposure information together with the exposure image 122 through the LVDS signal line for transmitting image data as illustrated in FIGS. 9 to 12.

As for other block rows, the exposure condition calculation unit 111 generates the exposure information, as in the block row 0, to sequentially accumulate the generated exposure information as the exposure time 112 and the analog gain value 113 for each region.

Figure 13:
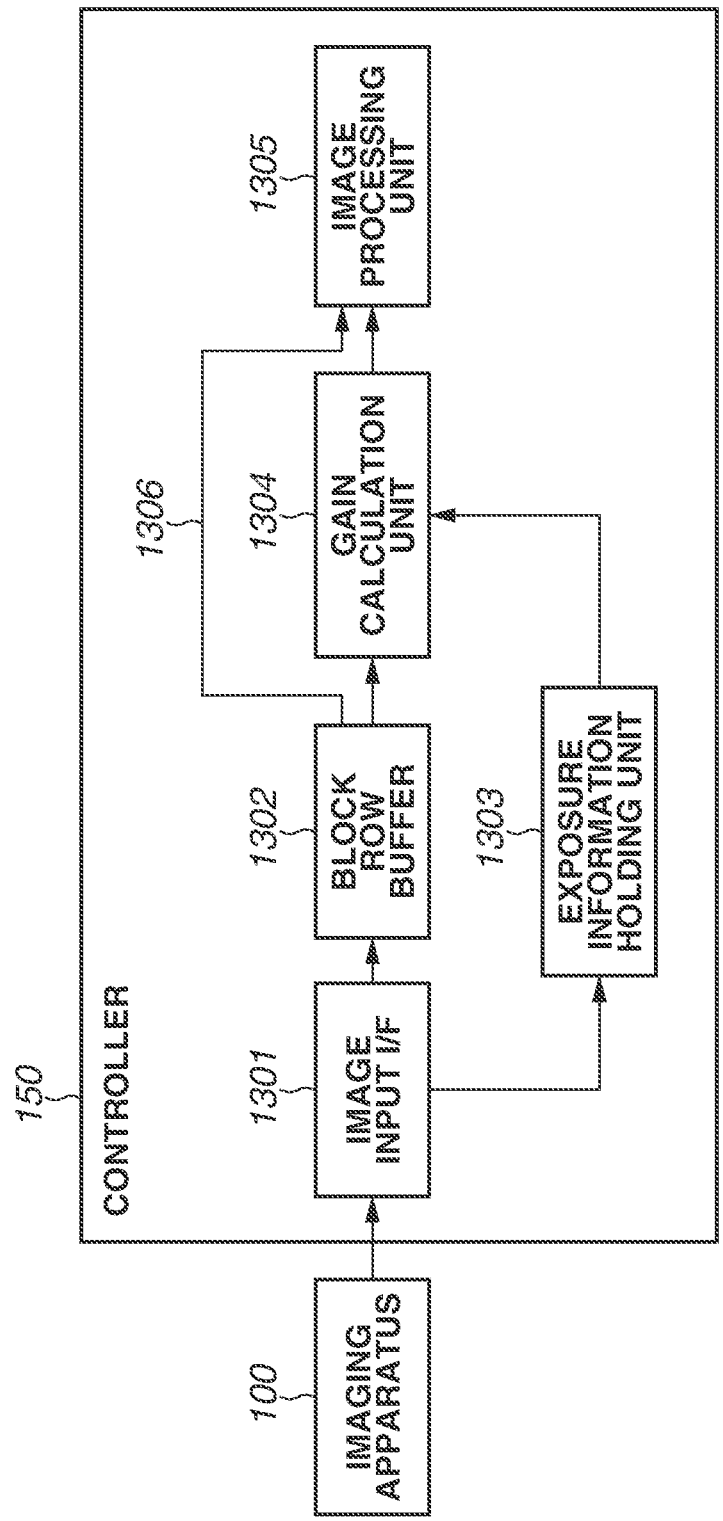
FIG. 13 is a block diagram illustrating a schematic configuration of a controller according to the first embodiment.

FIG. 13 is block diagram illustrating a schematic configuration of the controller 150 according to the first embodiment. The data transmitted from the imaging apparatus 100 through the LVDS signal line is received by an image input interface (I/F) 1301. The image input I/F 1301 analyzes the synchronization code and the identification code included in the received signal to detect the beginning of the frame data, and extracts the subsequent input data. In response to detecting the exposure information, the image input I/F 1301 transmits the detected exposure information to an exposure information holding unit 1303. The image input I/F 1301 transmits the OB region data and the exposure image for each region to a block row buffer 1302.

The block row buffer 1302 holds the OB region data and the exposure image for each region input from the image input I/F 1301 for the number of pixel rows included in the block row. In the present embodiment, since one block row includes 100 rows, the block row buffer 1302 holds the pixel data for 100 rows and then transmits, in the input order, the pixel data to a gain calculation unit 1304 to subject the pixel data to the exposure correction processing.

The exposure information holding unit 1303 holds the exposure information input from the image input I/F 1301. In the present embodiment, since the exposure information is superimposed in the 0th row to the 4th row of the block row as illustrated in FIG. 11, in a case where the vertical OB region includes, for example, 72 rows, the exposure information for the block row 0 is input to the exposure information holding unit 1303 with the image data in the subsequent 5 rows. As described above, the exposure image for each region to be input to the gain calculation unit 1304 delays for a time corresponding to the 100 pixel rows. Accordingly, the gain calculation unit 1304 can perform the gain calculation illustrated in FIGS. 6 to 8 using the exposure information for the corresponding block row already stored in the exposure information holding unit 1303, when the gain calculation unit 1304 performs processing on the pixel at the beginning position in each block row. The image data having been subjected to the gain calculation is transmitted to an image processing unit 1305 located at the subsequent stage, and subsequent image processing is performed.

As described above, the imaging apparatus 100 is enabled to output the exposure conditions through the image output signal line as the exposure information without waiting for the exposure conditions each for a region becoming completed for one frame, before completing outputting the exposure image for each region captured using the exposure condition applied to the corresponding region. The imaging apparatus 100 completes outputting the exposure information for the pixel blocks in the block row before completing outputting the image data of the block row, in the exposure image, to be subjected to the exposure correction processing. In this way, the controller 150 is enabled to perform the gain calculation of the exposure image for each received region and the exposure correction processing on the image without having a buffer for holding the image data of one frame and with a little delay. As a result, it is possible to obtain an image with a little delay and a high dynamic range in the image processing system including the imaging apparatus 100 and the controller 150.

In the present embodiment, since the correction processing is not performed by the imaging apparatus 100 side and the image is output, the controller 150 can select the pixel blocks to be used in the subsequent stage processing in performing the correction processing on the image, and can perform the correction processing. In this case, it is possible to implement the correction processing by selectively using, depending on the pixel block, a path 1306 for bypassing the image data without going through the gain calculation unit 1304.

In the above description, as illustrated in FIG. 9, the exposure information 905 is superimposed in the blank period before the pixel data for each row in the exposure image, more specifically, in the blanking region 903 between the synchronization code/identification code 904 and the OB region data 902. However, the exposure information only needs to be received by the controller 150 side before the image data for one block row to be processed using the exposure information becomes completed on the controller 150 side, and the exposure information needs not necessarily be superimposed as illustrated in FIG. 9.

Figure 14:
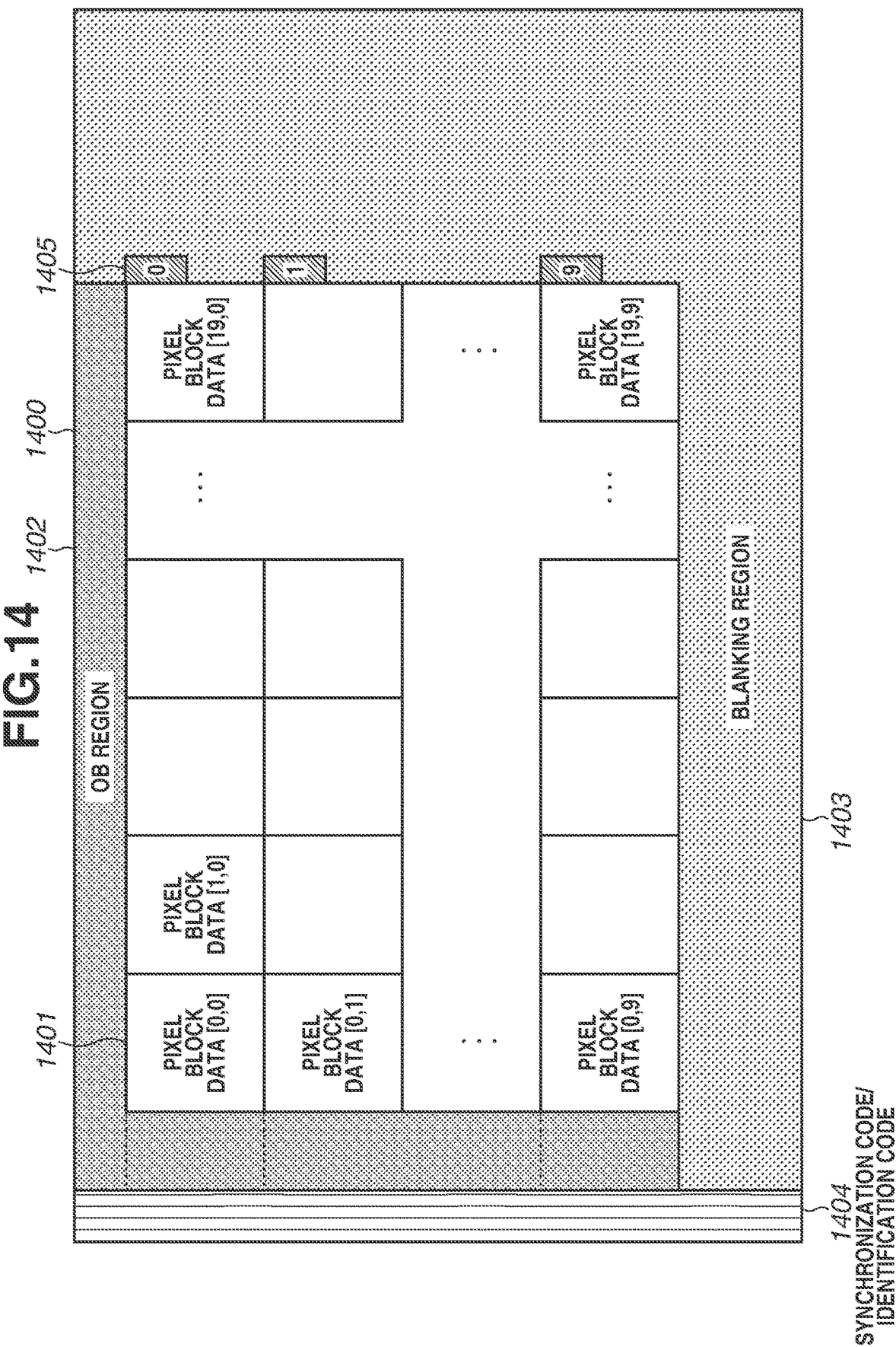
FIG. 14 is a diagram illustrating an arrangement order of the pieces of image data when the pieces of image data are output.

For example, as illustrated in FIG. 14, the exposure information may be superimposed in the blank period (blanking region) located after the pixel data for each row in the exposure image. In the example illustrated in FIG. 14, in frame data 1400, exposure information 1405 is superimposed over several rows from the top row, but the exposure information 1405 is positioned in a blanking region 1403 located after pixel block data 1401, which is an exposure image for each region. In FIG. 14, the exposure information 1405 to which one of the numerals 0 to 9 is added is the one applied to the pixel blocks included in the corresponding block row in the block rows 0 to 9. The exposure information 1405 is not provided before the pixel block data 1401 as in the FIG. 9, and data of the OB region data 1402 is provided immediately after the synchronization code/identification code 1404. The exposure information 1405 to be applied to the block row 0 is arranged from the top row at a position subsequent to the pixel block data [19, 0]. In a similar manner, the exposure information 1405 to be applied to the block row is disposed at the top row at a position subsequent to the pixel block data of each block row in a sequential order.

Hereinbelow, a second embodiment will be described with reference to FIGS. 15 to 18. In the first embodiment, the exposure information is transmitted to the controller 150 in the superimposed manner on the image data output signal line, but it is also possible to transmit the exposure information to the controller 150 using an I/F other than the image data output signal line. Hereinbelow, an example of such a case will be described.

Figure 15:
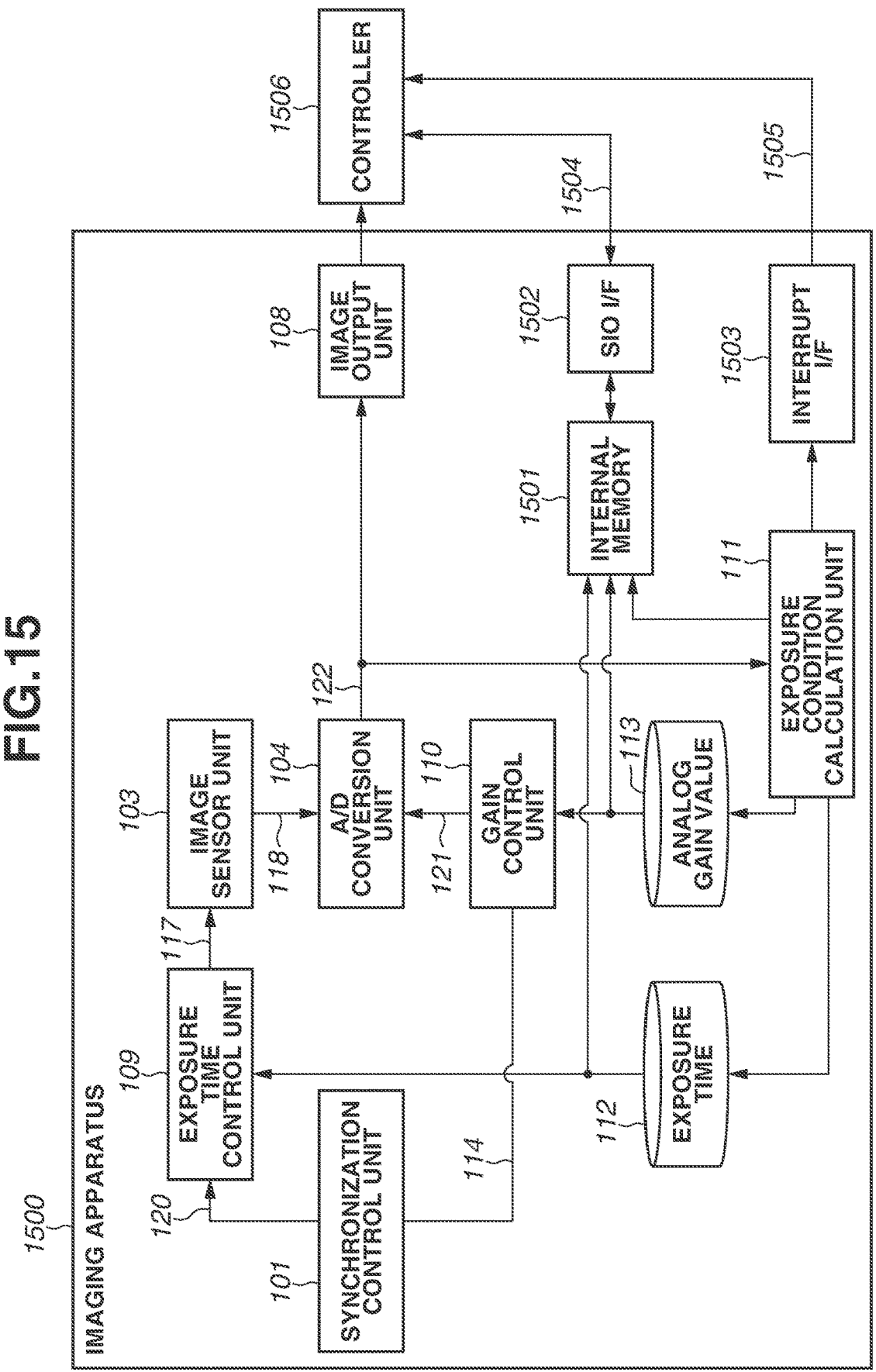
FIG. 15 is block diagram illustrating a schematic configuration of an imaging apparatus according to a second embodiment.

FIG. 15 is block diagram illustrating a schematic configuration of an imaging apparatus 1500 according to the second embodiment. The imaging apparatus 1500 according to the present embodiment includes various functions which general imaging apparatuses have, but in FIG. 15, only main components are illustrated to simplify the drawings and the descriptions. In FIG. 15, common components as those in FIG. 1 are assigned the same reference number and duplicate descriptions thereof are omitted.

In the imaging apparatus 1500 illustrated in FIG. 15, the exposure condition calculation unit 111 calculates the exposure time 112 and the analog gain value 113 for each region, and transmits the calculated exposure time 112 and the analog gain value 113 to the exposure time control unit 109 and the gain control unit 110, respectively. The exposure information including the value of the exposure time 112 and the analog gain value 113 for each region is transmitted also to an internal memory 1501. The exposure condition calculation unit 111 stores the exposure information in the internal memory 1501, and instructs an interrupt I/F 1503, each time an amount of the stored exposure information reaches a predetermined value, to output an interrupt pulse. In response to receiving the instruction to output the interrupt pulse from the exposure condition calculation unit 111, the interrupt I/F 1503 outputs an interrupt pulse to an interrupt signal line 1505.

A serial input and output (SIO) I/F 1502 transmits to and receives from a controller 1506 various types of information through a serial signal line 1504. For example, the SIO I/F 1502 transmit to and receives from the controller 1506 the exposure information and the readout request therefor through the serial signal line 1504. In the present embodiment, the image output unit 108 is an example of a first output unit, and the SIO I/F 1502 is an example of a second output unit. The interrupt I/F 1503 is an example of a notification unit, and the controller 1506 is an example of a processing apparatus.

Figure 17:
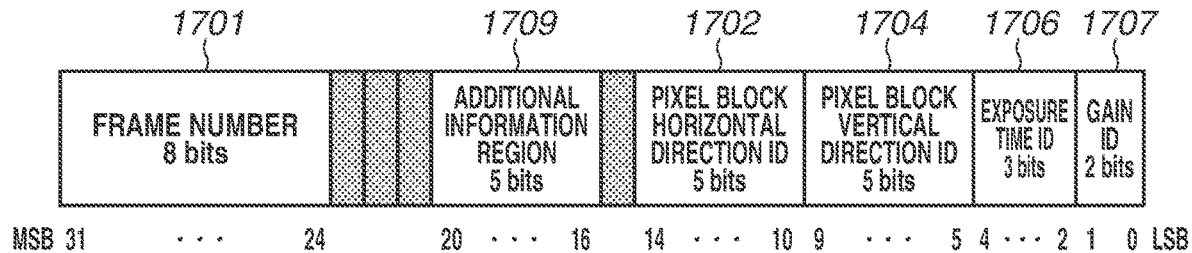
FIG. 17 is a diagram illustrating an example of a storage format for exposure information and related information.

The internal memory 1501 stores the exposure information and the related information in a format, for example, as illustrated in FIG. 17. FIG. 17 is a diagram illustrating an example of the storage format of the exposure information and the related information in the internal memory 1501. As illustrated FIG. 17, the information stored in the internal memory 1501 has almost the same contents as the information illustrated in FIG. 10 in the first embodiment. In the present embodiment, access to the internal memory 1501 is performed in 32 bit unit. Thus, the exposure information and the like is packed in 32 bits and stored in the internal memory 1501.

A pixel block horizontal direction ID 1702 is stored in bit 14 to bit 10 and a pixel block vertical direction ID 1704 is stored in bit 9 to bit 5. An exposure time ID 1706 of 3 bits is stored in bit 4 to bit 2, and a gain ID 1707 of 2 bits is stored in bit 1 to bit 0. Additional information 1709 of 5 bits is stored in bit 20 to bit 16. A frame number 1701 of 8 bits is stored in bit 31 to bit 24. The frame number 1701 is information to indicate a correspondence relationship with the frame, which is not present in FIG. 10 and is described in conjunction with the first embodiment. A value of the frame number 1701 is assigned in such a manner that the frame number increases one by one each time data corresponding to one frame is transmitted, and returns to 0 when the frame number reaches a maximum value. It is particularly effective when the exposure information is held in the internal memory 1501 in a double buffer format.

Figure 16:
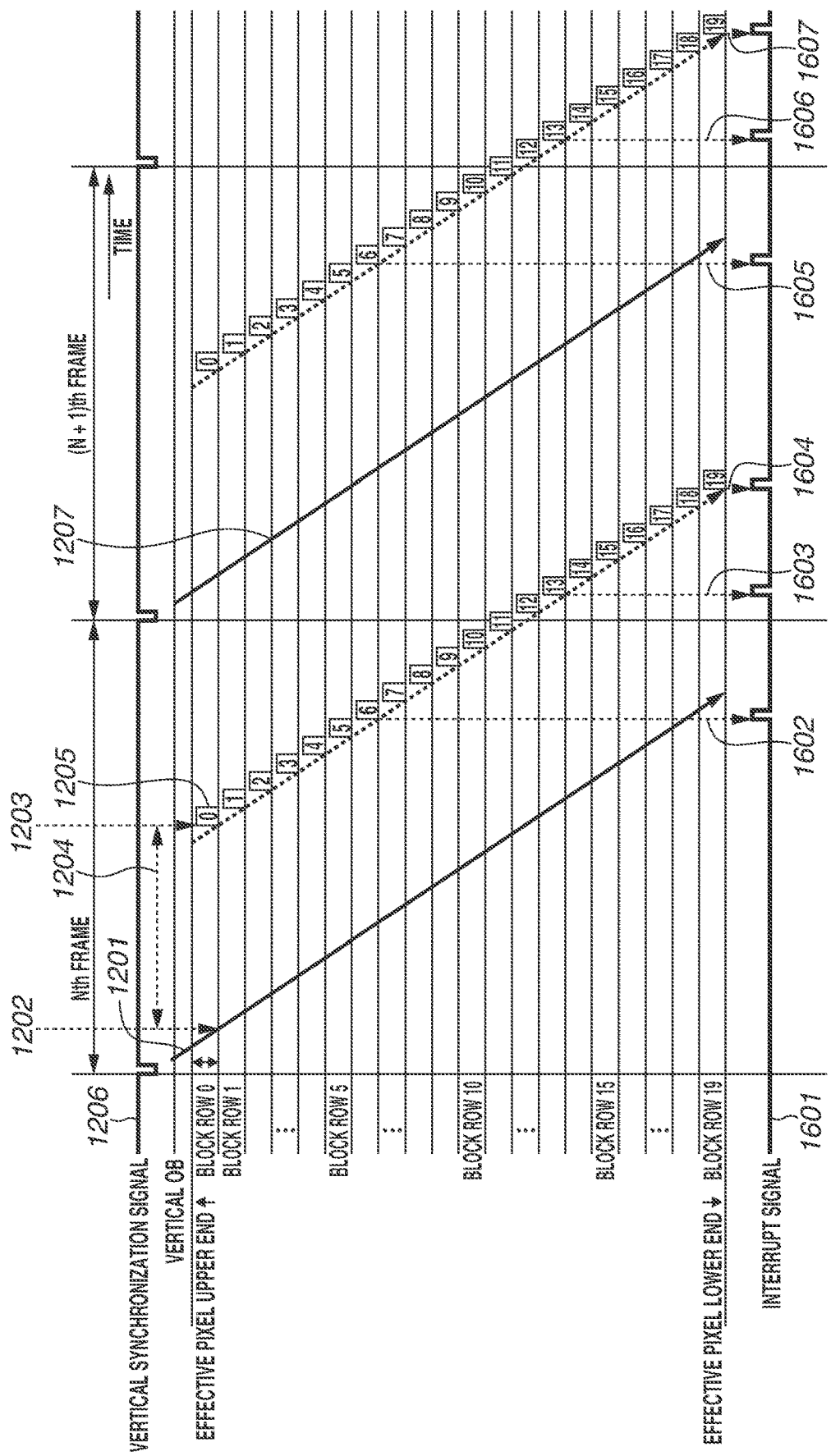
FIG. 16 is a diagram illustrating operation timings of the imaging apparatus according to the second embodiment.

Timings and the like at which the exposure information is generated and stored in the internal memory 1501 will be described with reference to FIG. 16. FIG. 16 is a diagram illustrating operation timings of the imaging apparatus 1500 according to the second embodiment. Common portions with those illustrated in FIG. 12 according to the first embodiment are assigned the same reference number in FIG. 12, and only the different portions are described.

The exposure condition calculation unit 111 generates exposure information to be applied to the pixel blocks of the block row 0 in the (N+1)th frame from the exposure images of the block row 0 in the Nth frame, using the time period 1204 illustrated in FIG. 16. At the time 1203, at which the time period 1204 has elapsed from the time 1202, the exposure condition calculation unit 111 completes generating the exposure information using the exposure images of the block row 0 in the Nth frame. At the timing of the time 1203, the exposure information 1205 to be applied to the pixel blocks of the block row 0 in the next (N+1)th frame is generated. The exposure information generated based on the exposure images in the Nth frame is schematically illustrated in a manner that the number indicating each block row is enclosed by a square in FIG. 16. The exposure information generated by the exposure condition calculation unit 111 is accumulated as the exposure time 112 and the analog gain value 113 for each region each time the generation is completed. In the present embodiment, the exposure information is also stored in the internal memory 1501. Then, each time exposure images of a new block row are input, an exposure condition corresponding to the new block row is sequentially generated by the exposure condition calculation unit 111 and the exposure information is stored in the internal memory 1501.

At a time 1602, the exposure condition calculation unit 111 completes generating the exposure information to be applied to the pixel blocks of the block row 6 in the (N+1)th frame to be generated using the exposure images of the block row 6 in the Nth frame. At a timing of the time 1602, the exposure condition calculation unit 111 instructs the interrupt I/F 1503 to output an interrupt pulse after writing in the internal memory 1501 the exposure information to be applied to the pixel blocks of the block row 6 in the (N+1)th frame. In response to receiving the instruction, the interrupt I/F 1503 output an interrupt pulse to the interrupt signal line 1505 as indicated by an interrupt signal 1601 illustrated in FIG. 16.

Similarly, at a time 1603, the exposure condition calculation unit 111 completes generating the exposure information to be applied to the pixel blocks of the block row 13 in the (N+1)th frame to be generated using the exposure images of the block row 13 in the Nth frame. Further, at a time 1604, the exposure condition calculation unit 111 completes generating the exposure information to be applied to the pixel blocks of the block row 19 in the (N+1)th frame to be generated using the exposure images of the block row 19 in the Nth frame. At the timings of the time 1603 and the time 1604, the exposure condition calculation unit 111 instructs the interrupt I/F 1503 to output an interrupt pulse as well. In response to receiving the instruction, the interrupt I/F 1503 outputs an interrupt pulse to the interrupt signal line 1505 as indicated by the interrupt signal 1601. The operation is similarly performed in the next (N+1)th frame, and interrupt pulses are generated at timings of a time 1605, a time 1606, and a time 1607.

In this way, the interrupt I/F 1503 that has received the instruction from the exposure condition calculation unit 111 outputs an interrupt pulse to the interrupt signal line 1505 and notifies the controller 1506 that the exposure information is generated and stored. In response to detecting the interrupt pulse input through the interrupt signal line 1505, the controller 1506 attempts to read out the exposure information from the internal memory 1501 in the imaging apparatus 1500 through the serial signal line 1504. The imaging apparatus 1500 receives a readout request from the controller 1506 by the SIO I/F 1502, and outputs the exposure information from the internal memory 1501. In the example of the present embodiment, the exposure information is output in a manner divided into three times without waiting for all pieces of the exposure information to be applied to one frame becoming completed.

Figure 18:
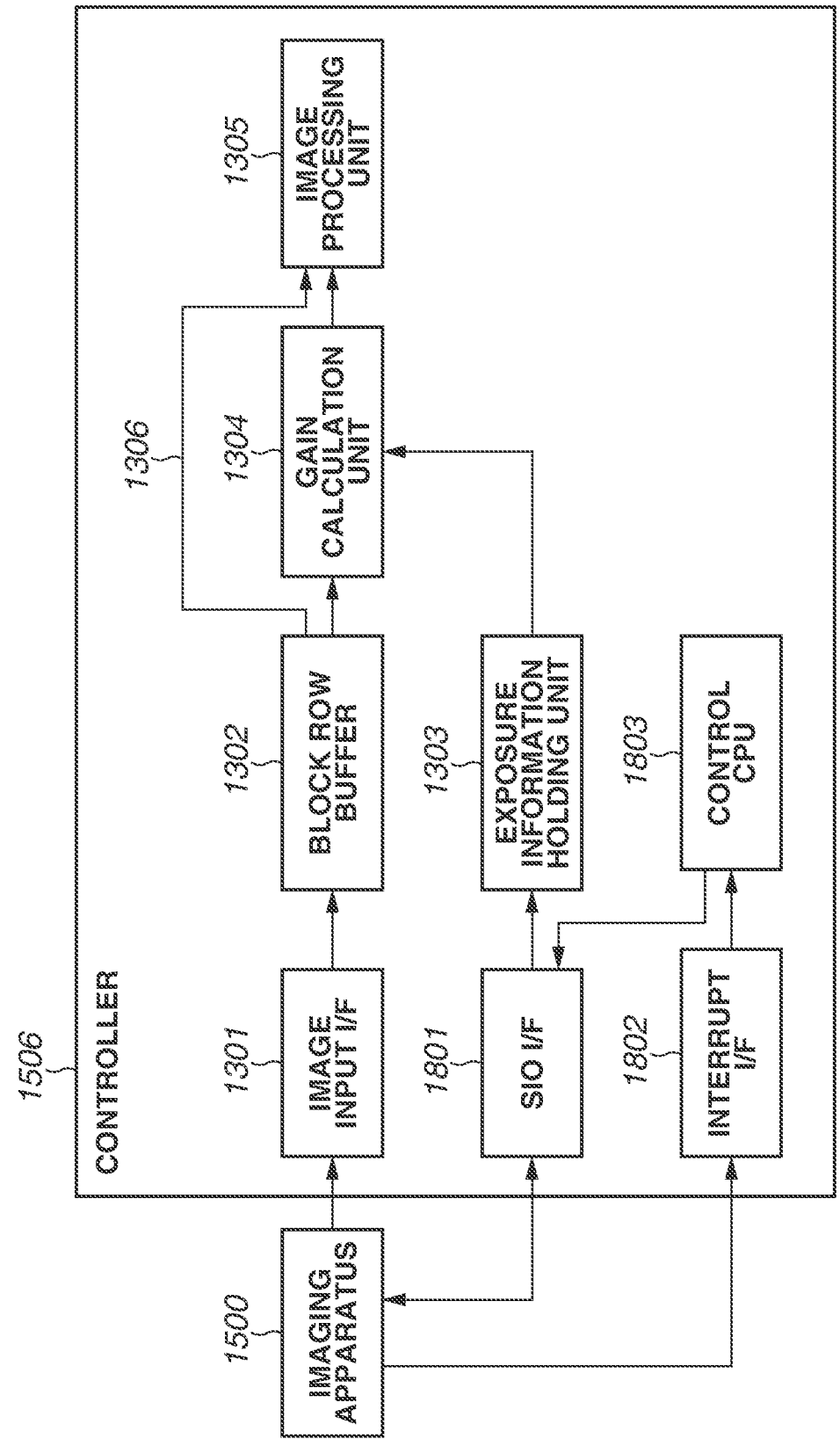
FIG. 18 is a block diagram illustrating a schematic configuration of a controller according to the second embodiment.

FIG. 18 is block diagram illustrating a schematic configuration of the controller 1506 according to the second embodiment. In FIG. 18, common components as those illustrated in FIG. 13 are assigned the same reference number and duplicate descriptions thereof are omitted. In response to an interrupt pulse being input from the imaging apparatus 1500 via an interrupt I/F 1802, a control central processing unit (CPU) 1803 in the controller 1506 instructs an SIO I/F 1801 to read out the exposure information from the imaging apparatus 1500. The SIO I/F 1801 that has received the instruction outputs a readout request to read out the exposure information, to the imaging apparatus 1500. At this time, the SIO I/F 1801 outputs the readout request to acquire the exposure information for the block row 0 to the block row 6 in response to the interrupt pulse input at the timing of the time 1602 illustrated in FIG. 16. Similarly, the SIO I/F 1801 outputs a readout request to acquire the exposure information for the block row 7 to the block row 13 in response to the interrupt pulse input at the timing of the time 1603 illustrated in FIG. 16. The SIO I/F 1801 outputs a readout request to acquire the exposure information for the block row 14 to the block row 19 in response to the interrupt pulse input at the timing of the time 1604 illustrated in FIG. 16.

The transfer speed of the SIO is set in such a manner that the time to transfer the exposure information for 1 block row is shorter than the time to transfer the image data for one block row from the imaging apparatus 1500 to the controller 1506. Which exposure information for the block row is to be obtained in response to which interrupt pulse is determined in advance using the parameter settings through communication of settings between the controller 1506 and the imaging apparatus 1500. The generation timing of the interrupt pulse and the number of pieces of exchanged exposure information accompanying the generation of the interrupt pulse in the example of the present embodiment are merely examples and not limited to the above-described examples.

In this way, the controller 1506 that has received the exposure information from the imaging apparatus 1500 sequentially transfers the exposure information from the SIO I/F 1801 to the exposure information holding unit 1303. The gain calculation unit 1304 reads out from the exposure information holding unit 1303 the exposure information for the block row corresponding to the position of the pixel data output from the block row buffer 1302, and performs the gain calculation.

As described above, the imaging apparatus 1500 can output the exposure conditions as the exposure information without waiting for the exposure conditions, each for a region, for one frame becoming completed before completion of outputting the exposure image for each region captured using the exposure condition applied to each region. The imaging apparatus 1500 completes outputting the exposure information for the pixel blocks in the block row before completion of outputting the image data of the block row to be subjected to the exposure correction processing in the exposure image. In this way, the controller 1506 can perform the gain calculation of the received exposure image for each region and the exposure correction processing on the image, without having a buffer for holding the image data for one frame and with a little delay. As a result, it is possible to obtain an image with a little delay and a high dynamic range in the image processing system including the imaging apparatus 1500 and the controller 1506.

Other Embodiments

The present invention can be realized by processing of supplying a program for implementing one or more functions of the above-described embodiments to a system or an apparatus via a network or a storage medium, and one or more processors in the system or the apparatus reading and executing the program. The present invention can also be realized by a circuit (e.g., application specific integrated circuits (ASIC)) that can implement one or more functions.

The above-described embodiments are merely examples of the present invention and shall not be construed as limiting the technical range of the present invention. The present invention can be realized in diverse ways so long as it is in accordance with the technological thought or main features of the present invention.

While the present invention has been described with reference to embodiments, it is to be understood that the invention is not limited to the disclosed embodiments but is defined by the scope of the following claims.

This application claims the benefit of Japanese Patent Application No. 2021-103045, filed Jun. 22, 2021, which is hereby incorporated by reference herein in its entirety.

What is claimed is:

1. An imaging apparatus comprising:
a first output unit configured to output, outside the imaging apparatus including an image sensor, a first image captured by the image sensor, the first image having an imaging region divided into a plurality of regions wherein an exposure condition is controlled for each of the plurality of regions; and
a second output unit configured to output, outside the imaging apparatus including the image sensor, exposure information for each of the plurality of regions, the exposure information indicating the exposure condition to be applied to the corresponding one of the plurality of regions when the first image is captured;
wherein the second output unit is configured to complete outputting, outside the imaging apparatus including the image sensor, exposure information for a region to be subjected to exposure correction processing in the first image, out of the plurality of regions, before the first output unit completes outputting the plurality of the regions of the captured first image subject to exposure correction processing.

2. The imaging apparatus according to claim 1, wherein the exposure condition includes an exposure time and an analog gain related to an analog to digital conversion which correspond to each one of the plurality of regions of the image sensor.

3. The imaging apparatus according to claim 1, further comprising a superimposition unit,
wherein the first output unit and the second output unit are configured as one output unit; and
wherein the superimposition unit is configured to associate the exposure information with the first image when the exposure information is output.

4. The imaging apparatus according to claim 3, wherein the first image comprises frame data including pixel block data and a blanking region and the superimposition unit is configured to insert the exposure information in the blanking region when the first image is output.

5. The imaging apparatus according to claim 4, wherein the superimposition unit is configured to insert the exposure information in the blanking region before pixel block data for each row in the first image.

6. The imaging apparatus according to claim 4, wherein the superimposition unit is configured to insert the exposure information in the blanking region after pixel block data for each row in the first image.

7. The imaging apparatus according to claim 1, further comprising a notification unit for issuing a notification, outside the imaging apparatus, that the exposure information has been generated.

8. The imaging apparatus according to claim 1, further comprising an exposure condition calculation unit configured to calculate the exposure condition to be applied to each one of the plurality of regions when the first image is captured based on a second image which is one frame before the first image.

9. An image processing system comprising:
the imaging apparatus according to claim 1, and
a processing apparatus configured to perform, in response to receiving the first image and the exposure information output from the imaging apparatus, exposure correction processing on the first image using the exposure information.

10. The image processing system according to claim 9, wherein the processing apparatus performs the exposure correction processing on a selected region in the first image using the exposure information.

11. The imaging apparatus according to claim 1
wherein the exposure correction processing is performed by a controller which is outside the imaging apparatus after at least a region of the first image is captured and is outputted, and
wherein the exposure information outputted by the second output unit is used for the exposure correction processing.

12. The imaging apparatus according to claim 1
wherein the second output unit is configured to complete outputting, outside the imaging apparatus including the image sensor, the exposure information after an image of the region subject to exposure correction processing is captured by the image sensor and before the first output unit completes outputting the plurality of the regions of the captured first image subject to exposure correction processing.

13. A control method for an imaging apparatus, the control method comprising:
- outputting, outside the imaging apparatus including an image sensor, a first image captured by the image sensor, the first image having an imaging region divided into a plurality of regions wherein an exposure condition is controlled for each of the plurality of regions, and
- outputting, outside the imaging apparatus including the image sensor, exposure information, for each of the plurality of regions, the exposure information indicating the exposure condition to be applied to the corresponding one of the plurality of regions when the first image is captured;
- wherein, outputting, outside the imaging apparatus including the image sensor, the exposure information comprises outputting, outside the imaging apparatus including the image sensor, the exposure information for a region to be subjected to exposure correction processing in the first image, out of the plurality of regions, before outputting the plurality of the regions of the captured first image subject to exposure correction processing.

* * * * *